US009240853B2

(12) United States Patent
Nikopour et al.

(10) Patent No.: US 9,240,853 B2
(45) Date of Patent: Jan. 19, 2016

(54) SYSTEMS AND METHODS FOR SPARSE CODE MULTIPLE ACCESS

(71) Applicant: Huawei Technologies Co., Ltd., Shenzhen (CN)

(72) Inventors: Hosein Nikopour, San Jose, CA (US); Mohammadhadi Baligh, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 213 days.

(21) Appl. No.: 13/730,355

(22) Filed: Dec. 28, 2012

(65) Prior Publication Data

US 2014/0140360 A1 May 22, 2014

Related U.S. Application Data

(60) Provisional application No. 61/727,486, filed on Nov. 16, 2012.

(51) Int. Cl.
*H04B 7/04* (2006.01)
*H04J 13/00* (2011.01)

(52) U.S. Cl.
CPC .................................... *H04J 13/00* (2013.01)

(58) Field of Classification Search
None
See application file for complete search history.

(56) References Cited

U.S. PATENT DOCUMENTS

| | | | | |
|---|---|---|---|---|
| 6,434,133 B1 * | 8/2002 | Hamalainen | .................. | 370/338 |
| 7,657,429 B2 * | 2/2010 | Tsushima | ..................... | 704/230 |
| 8,219,873 B1 * | 7/2012 | Ng et al. | ........................ | 714/752 |
| 8,245,092 B2 * | 8/2012 | Kotecha et al. | ................ | 714/748 |
| 8,705,574 B2 * | 4/2014 | Hammarwall et al. | ........ | 370/478 |
| 8,719,654 B2 * | 5/2014 | Kotecha et al. | ................ | 714/748 |
| 8,737,509 B2 * | 5/2014 | Yu et al. | ......................... | 375/267 |
| 2009/0196379 A1 * | 8/2009 | Gan et al. | ...................... | 375/340 |
| 2009/0285122 A1 * | 11/2009 | Onggosanusi et al. | ........ | 370/254 |
| 2010/0115358 A1 * | 5/2010 | Kotecha et al. | ................ | 714/748 |
| 2010/0239040 A1 * | 9/2010 | Beluri et al. | .................. | 375/267 |
| 2011/0170625 A1 | 7/2011 | Blankenship et al. | | |
| 2011/0261894 A1 * | 10/2011 | Yu et al. | ......................... | 375/267 |
| 2011/0274123 A1 * | 11/2011 | Hammarwall et al. | ........ | 370/479 |
| 2012/0183020 A1 * | 7/2012 | Koike-Akino et al. | ........ | 375/219 |
| 2012/0224554 A1 * | 9/2012 | Park | ............................... | 370/329 |

(Continued)

FOREIGN PATENT DOCUMENTS

CN 101860386 A 10/2010
CN 102232319 A 11/2011

(Continued)

OTHER PUBLICATIONS

Al-Imari et al.: Low Density Spreading for Next Generation Multicarrier Cellular Systems: Apr. 2012.*

(Continued)

*Primary Examiner* — Jay P Patel
(74) *Attorney, Agent, or Firm* — Slater & Matsil, L.L.P.

(57) ABSTRACT

Coding gains can be achieved by encoding binary data directly to multi-dimensional codewords, which circumvents QAM symbol mapping employed by conventional CDMA encoding techniques. Further, multiple access can be achieved by assigning different codebooks to different multiplexed layers. Moreover, sparse codewords can be used to reduce baseband processing complexity on the receiver-side of the network, as sparse codewords can be detected within multiplexed codewords in accordance with message passing algorithms (MPAs).

21 Claims, 23 Drawing Sheets

(56) References Cited

U.S. PATENT DOCUMENTS

| | | | | |
|---|---|---|---|---|
| 2012/0294382 | A1* | 11/2012 | Wang et al. | 375/267 |
| 2012/0300711 | A1* | 11/2012 | Wang et al. | 370/329 |
| 2013/0036338 | A1* | 2/2013 | Kotecha et al. | 714/748 |
| 2013/0094468 | A1* | 4/2013 | Ko et al. | 370/329 |
| 2013/0182791 | A1 | 7/2013 | Dhakal et al. | |
| 2013/0188751 | A1* | 7/2013 | Ohlmer et al. | 375/296 |
| 2014/0140289 | A1* | 5/2014 | Moulsley | 370/329 |
| 2014/0226742 | A1* | 8/2014 | Yu et al. | 375/267 |
| 2014/0245094 | A1* | 8/2014 | Kotecha et al. | 714/748 |

FOREIGN PATENT DOCUMENTS

| | | | | |
|---|---|---|---|---|
| CN | 102439866 | A | 5/2012 | |
| CN | 103262453 | A | 8/2013 | |
| WO | WO 2010/102435 | A1 * | 9/2010 | H04W 74/00 |
| WO | 2012048218 | A1 | 4/2012 | |

OTHER PUBLICATIONS

Zhang et al. : A Survey on 5G New Waveform: From Energy Efficiency Aspects.*

Beko, M., et al., "Designing Good Multi-Dimensional Constellations," IEEE Wireless Communications Letters, vol. 1, No. 3, Jun. 2012, pp. 221-224.

Hoshyar, R., et al., "Novel Low-Density Signature for Synchronous CDMA Systems Over AWGN Channel," IEEE Transactions on Signal Processing, vol. 56, No. 4, Apr. 2008, pp. 1616-1626.

Van De Beek, J., et al., "Multiple Access with Low-Density Signatures," Huawei Technologies Sweden, IEEE GLOBECOM, 2009 proceedings, 6 pages.

International Search Report and Written Opinion received in Application No. PCT/CN2013/087311 mailed Feb. 6, 2014, 13 pages.

International Search Report and Written Opinion received in International Application No. PCT/CN2015/075434 mailed Jul. 3, 2015, 11 pages.

Burr, A. G., "Capacity Improvement of CDMA Systems Using M-ary Code Shift Keying," in Mobile Radio and Personal Communications, Sixth International Conference on Mobile Radio and Personal Communications, Dec. 9-11, 1991, pp. 63-67.

Extended European Search Report received in European Application No. 13855651 dated Sep. 23, 2015, 9 pages.

Prasad, R., et al., "An Overview of Multi-carrier CDMA," IEEE 4th International Symposium on Spread Spectrum Techniques and Applications Proceedings, Sep. 22-25, 1996, pp. 107-114.

Schotten, H. D., et al., "Adaptive Multi-Rate Multi-Code CDMA Systems," 48th IEEE Vehicular Technology Conference, May 18-21, 1998. vol. 2, pp. 782-785.

* cited by examiner

SYSTEMS AND METHODS FOR SPARSE CODE MULTIPLE ACCESS

This application claims the benefit of U.S. Provisional Application 61/727,486 filed on Nov. 16, 2012, entitled "Systems and Methods for Sparse Code Multiple Access," which is incorporated herein by reference as if reproduced in its entirety.

TECHNICAL FIELD

The present invention relates to communications, and, in particular embodiments, to systems and methods for sparse code multiple access.

BACKGROUND

Code division multiple access (CDMA) is a multiple access technique in which the data symbols are spread out over orthogonal or near orthogonal code sequences. Traditional CDMA encoding is a two step process in which a binary code is mapped to a quadrature amplitude modulation (QAM) symbol before a spreading sequence is applied. While traditional CDMA encoding can provide relatively high coding rates, new techniques/mechanisms for achieving even higher coding rates are needed to meet the ever-growing demands of next-generation wireless networks.

SUMMARY OF THE INVENTION

Technical advantages are generally achieved, by embodiments of this disclosure which describe systems and methods for sparse code multiple access.

In accordance with an embodiment, a method for multiplexing data is provided. In this example, the method includes receiving a first binary data associated with a first multiplexed layer, encoding the first binary data by selecting a first codeword from a first codebook, and multiplexing the first codeword with at least a second codeword from a second codebook to obtain multiplexed codewords. The first codebook is assigned exclusively to the first multiplexed layer, and the second codebook is assigned exclusively to a second multiplexed layer. The method further includes transmitting the multiplexed codewords over shared resources of a network. An apparatus for performing this method is also provided.

In accordance with another embodiment, a method for receiving data is provided. In this example, the method includes receiving a signal carrying multiplexed codewords. The multiplexed codewords include codewords belonging to multiple codebooks, with each codebook being assigned to a different multiplexed layer. The method further includes identifying a first codewords within the multiplexed codewords by a receiver associated with a first multiplexed layer. The first codeword belongs to a codebook that is assigned exclusively to the first multiplexed layer. The method further includes decoding the first codeword to obtain a first binary. An apparatus for performing this method is also provided.

In accordance with another embodiment, a method for designing Sparse Code Multiple Access (SCMA) code is provided. In this example, the method includes generating a plurality of multi-dimensional modulation codebooks, and generating a plurality of sparse codebooks from the plurality of multi-dimensional modulation codebooks. A method for designing low density signatures (LDS) is also provided.

BRIEF DESCRIPTION OF THE DRAWINGS

For a more complete understanding of this disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments disclosed herein are discussed in detail below. It should be appreciated, however, that the present disclosure provides many applicable inventive concepts that can be embodied in a wide variety of specific contexts. The specific embodiments discussed are merely illustrative of specific ways to make and use the invention, and do not limit the scope of the invention.

Disclosed herein is a Sparse Code Multiple Access (SCMA) encoding technique that encodes binary data streams directly to multi-dimensional codewords. By directly encoding the binary data to multi-dimensional codewords, the SCMA encoding techniques described herein circumvent QAM symbol mapping, thereby achieving coding gains over conventional CDMA encoding. Notably, the SCMA encoding techniques described herein convey binary data using the multi-dimensional codeword, rather than a QAM symbol. Moreover, the SCMA encoding techniques of this disclosure provide multiple access through assigning a different codebook for each multiplexed layer, as opposed to using a unique spreading sequence (e.g., LDS signature, etc.) as is common in conventional CDMA encoding. Further, the SCMA codebooks comprise sparse codewords such that receivers can use low complexity message passing algorithms (MPAs) to detect their respective codewords amongst the multiplexed codewords, which reduces baseband processing complexity on the receiver side. While much of this disclosure may be discussed in the context of binary data, aspects of this disclosure are equally applicable to other kinds of data, such as M-ary data.

Figure 1:
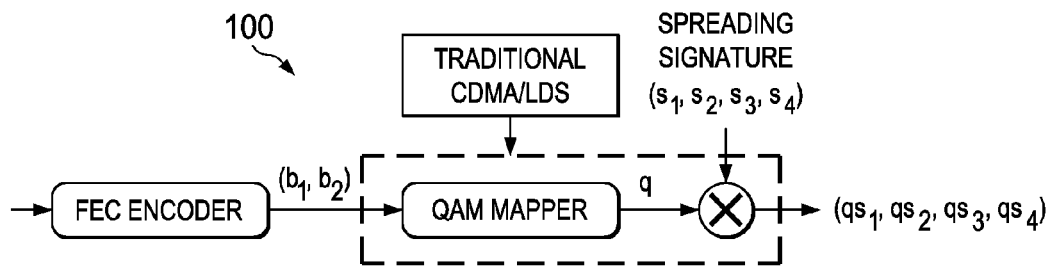
FIG. 1 illustrates a diagram of a conventional CDMA encoder.

FIG. 1 illustrates a traditional CDMA encoder 100 for encoding data. As shown, the CDMA encoder 100 maps binary data received from the FEC encoder to QAM symbols, and then applies spreading signatures ($s_1$, $s_2$, $s_3$, $s_4$) to obtain the encoded data stream ($qs_1$, $qs_2$, $qs_3$, $qs_4$). Notably, the spreading signatures ($s_1$, $s_2$, $s_3$, $s_4$) are CDMA spreading sequences (e.g., LDS signatures, etc.) assigned to different multiplexed layers in order to achieve multiple-access.

Figure 2:
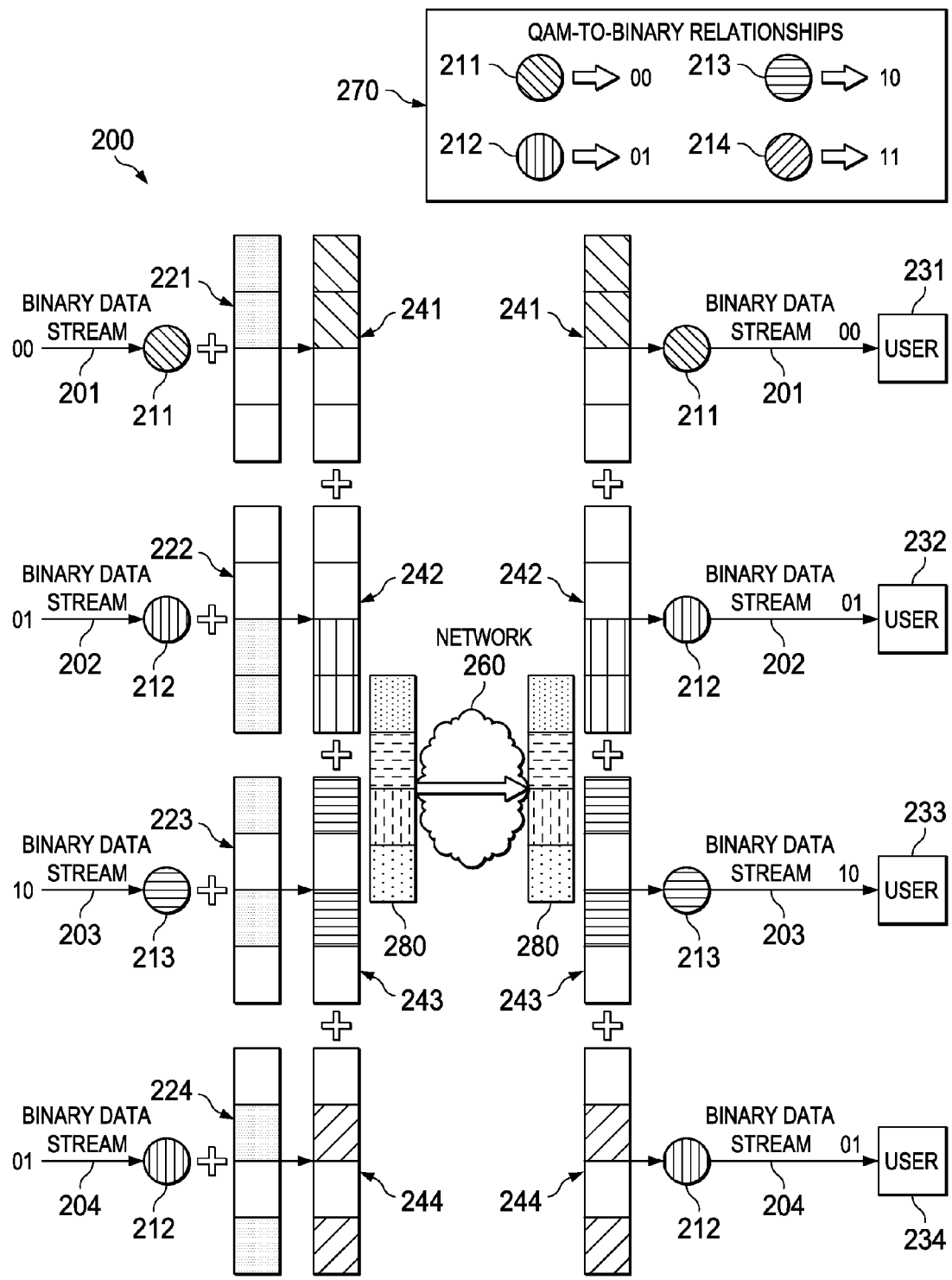
FIG. 2 illustrates a diagram of a conventional CDMA encoding architecture.

FIG. 2 illustrates an example of conventional CDMA encoding architecture 200 for communicating binary data streams 201-204 to a plurality of users 231-234 over a network 260, as might be performed by the conventional CDMA encoder 100. As shown, each binary data stream 201-204 is mapped to the QAM symbols 211-214 in accordance with a QAM-to-binary relationship 270. As an example, the QAM symbol 211 is associated with the binary value '00', the QAM symbol 212 is associated with the binary value '01', the QAM symbol 213 is associated with the binary value '10', and the QAM symbol 214 is associated with the binary value '11'. Accordingly, the QAM symbol 211 is mapped to the binary data stream 201, the QAM symbol 212 is mapped to the binary data streams 202 and 204, and the QAM symbol 213 is mapped to the binary data stream 203.

Following the binary-to-QAM mapping, the QAM symbols 211-214 are multiplexed together in accordance with the LDS signatures 221-224. Notably, each of the LDS signatures 221-224 are mapped to different multiplexed layers, which are assigned to different ones of the users 231-234 to achieve multiple access. Therefore, the LDS signatures 221-224 remain fixed (i.e., do not vary based on the binary values in the binary data streams 201-204). Thereafter, the resulting one dimensional codewords 241-244 are multiplexed together, to form multiplexed codewords 280, which are transmitted over the network 260. Upon reception, the multiplexed codewords 280 are de-multiplexed in accordance with the LDS signatures 221-224 to obtain the QAM symbols 211-214, which are used to obtain the binary data streams 201-204 in accordance with the QAM-to-binary relationship 270.

Figure 3:
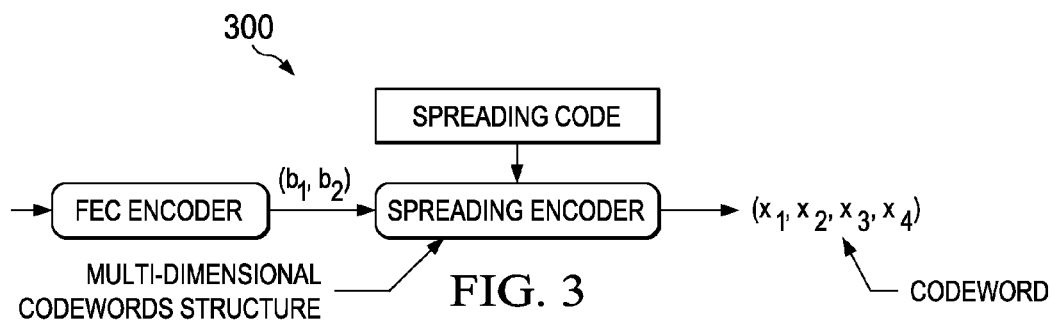
FIG. 3 illustrates a diagram of an embodiment SCMA encoder.

FIG. 3 illustrates an SCMA encoder 300 for encoding data in accordance with aspects of this disclosure. As shown, the SCMA encoder 300 maps binary data received from the FEC encoder directly to multi-dimensional codewords to obtain the encoded data stream ($x_1$, $x_2$, $x_3$, $x_4$). Multi-dimensional codewords may belong to different multi-dimensional codebooks, with each codebook being associated with a different multiplexed layer. As discussed herein, multiplexed layers may include any layer over which multiple data streams may be communicated over shared resources of a network. For instance, multiplexed layers may comprise multiple-input-multiple-output (MIMO) spatial layers, Orthogonal Frequency-Division Multiple Access (OFDMA) tones, time division multiple access (TDMA) layers, and others.

Figure 4:
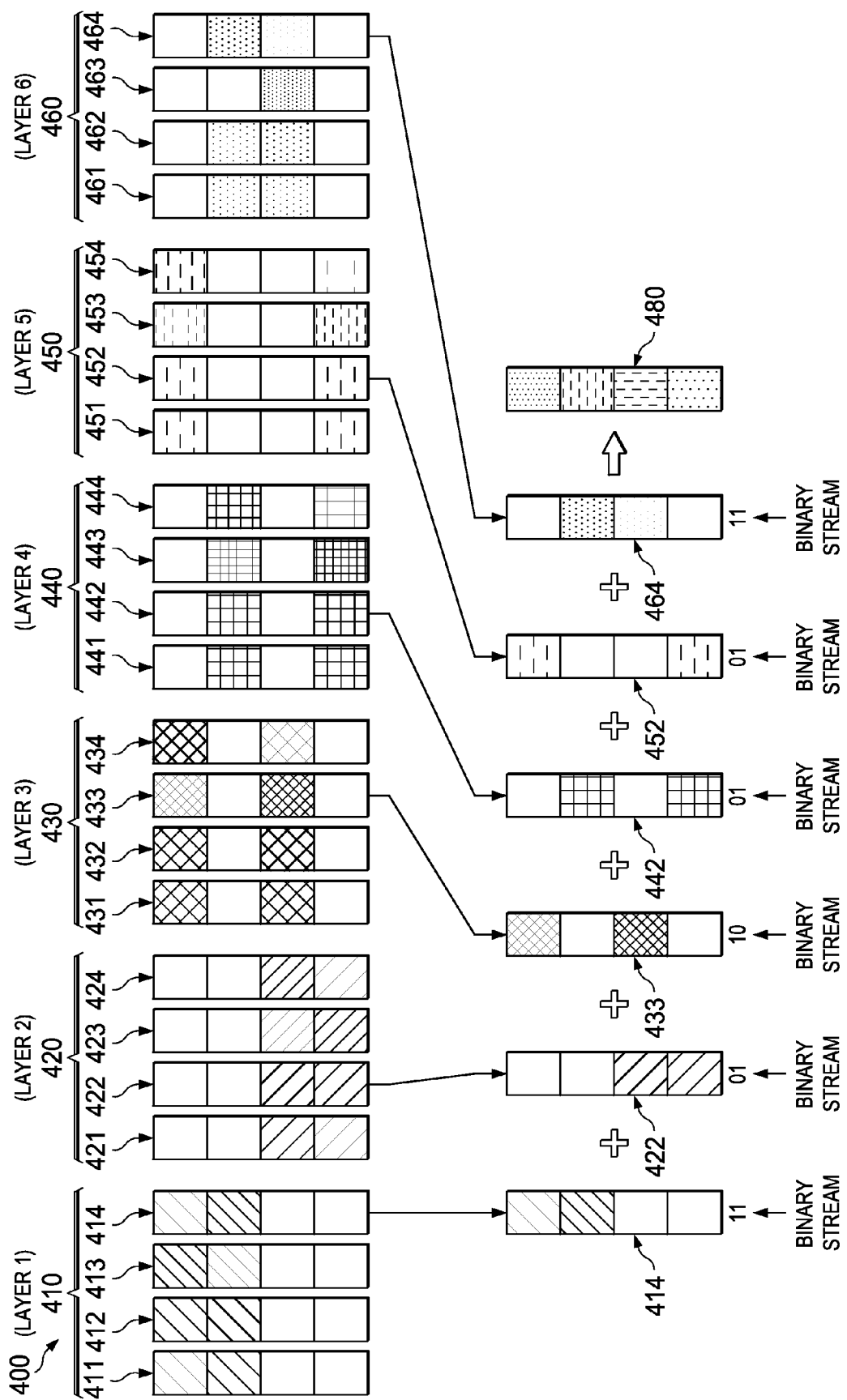
FIG. 4 illustrates a diagram of an embodiment SCMA encoding architecture.

FIG. 4 illustrates an example of an SCMA multiplexing scheme 400 for encoding data in accordance with aspects of this disclosure. As shown, the SCMA multiplexing scheme 400 may utilize a plurality of codebooks 410, 420, 430, 440, 450, and 460 each of which being assigned to a different multiplexed layer and including a plurality of multi-dimensional codewords. More specifically, the codebook 410 includes the codewords 411-414, the codebook 420 includes the codewords 421-424, the codebook 430 includes the codewords 431-434, the codebook 440 includes the codewords 441-444, the codebook 450 includes the codewords 451-454, and the codebook 460 includes the codewords 461-464. Each codeword of a respective codebook is mapped to a different binary value. In this example, the codewords 411, 421, 431, 441, 451, and 461 are mapped to the binary value '00', the codewords 412, 422, 432, 442, 452, and 462 are mapped to the binary value '01', the codewords 413, 423, 433, 443, 453, and 463 are mapped to the binary value '10', and the codewords 414, 424, 434, 444, 454, and 464 are mapped to the binary value '11'. Although the codebooks in FIG. 4 are depicted as having four codewords apiece, SMAC codebooks may have any number of codewords. For instance, SMAC codebooks may have 9 codewords (e.g., mapped to binary values '000' . . . '111'), 16 codewords (e.g., mapped to binary values '0000' . . . '1111'), or more.

As shown, different codewords are selected from the various codebooks 410, 420, 430, 440, 450, and 460 depending on the binary data being transmitted over the multiplexed layer. In this example, the codeword 414 is selected from the codebook 410 because the binary value '11' is being transmitted over the first multiplexed layer, the codeword 422 is selected from the codebook 420 because the binary value '01' is being transmitted over the second multiplexed layer, the codeword 433 is selected from the codebook 430 because the binary value '10' is being transmitted over the third multiplexed layer, the codeword 442 is selected from the codebook 440 because the binary value '01' is being transmitted over the fourth multiplexed layer, the codeword 452 is selected from the codebook 450 because the binary value '01' is being transmitted over the fifth multiplexed layer, and the codeword 464 is selected from the codebook 460 because the binary value '11' is being transmitted over the sixth multiplexed layer. The codewords 414, 422, 433, 442, 452, and 464 are then multiplexed together to form the multiplexed data stream 480, which is transmitted over shared resources of a network. Notably, the codewords 414, 422, 433, 442, 452, and 464 are sparse codewords, and therefore can be identified upon reception of the multiplexed data stream 480 using a MPA.

Figure 5:
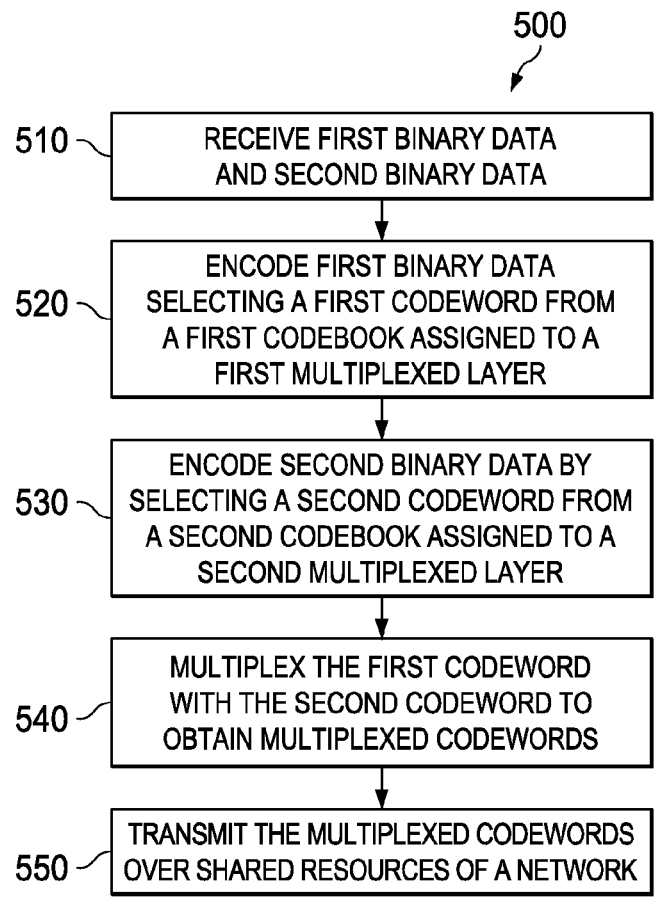
FIG. 5 illustrates a flowchart of an embodiment method for encoding data.

FIG. 5 illustrates a method 500 for communicating data over a network in accordance with aspects of this disclosure, as may be performed by a transmitter. The method 500 begins at step 510, where the transmitter receives input data, including a first binary data and a second binary data. Next, the method 500 proceeds to step 520, where the transmitter encodes the first binary data stream by selecting a first codeword from a first codebook assigned to a first multiplexed layer. Thereafter, the method 500 proceeds to step 530, where the transmitter encodes the second binary data stream by selecting a second codeword from a second codebook assigned to second multiplexed layer. Subsequently, the method 500 proceeds to step 540, where the transmitter multiplexes the first codeword with the second codeword to obtain multiplexed codewords. Finally, the method 500 proceeds to step 550, where the transmitter transmits the multiplexed codewords over shared resources of the network.

Figure 6:
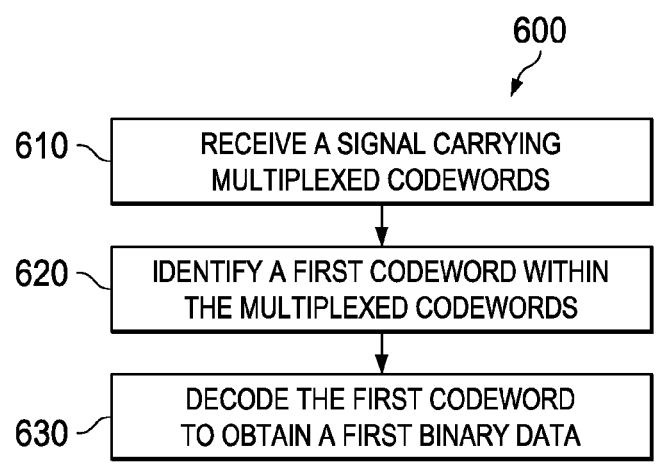
FIG. 6 illustrates a flowchart of an embodiment method for decoding data.

FIG. 6 illustrates a method 600 for receiving data multiplexed in accordance with aspects of this disclosure, as may be performed by a receiver associated with a first multiplexed layer. The method 600 begins at step 610, where the receiver receives a signal carrying multiplexed codewords. Next, the method 600 proceeds to step 620, where the receiver identifies a first codeword with the multiplexed codewords. The first codeword is from a first codebook associated with the first multiplexed layer, and may be identified by the receiver in accordance with a MPA. Thereafter, the method 600 proceeds to step 630, where the receiver decodes the first codeword in accordance with the first codebook to obtain a first binary data.

Figure 7:
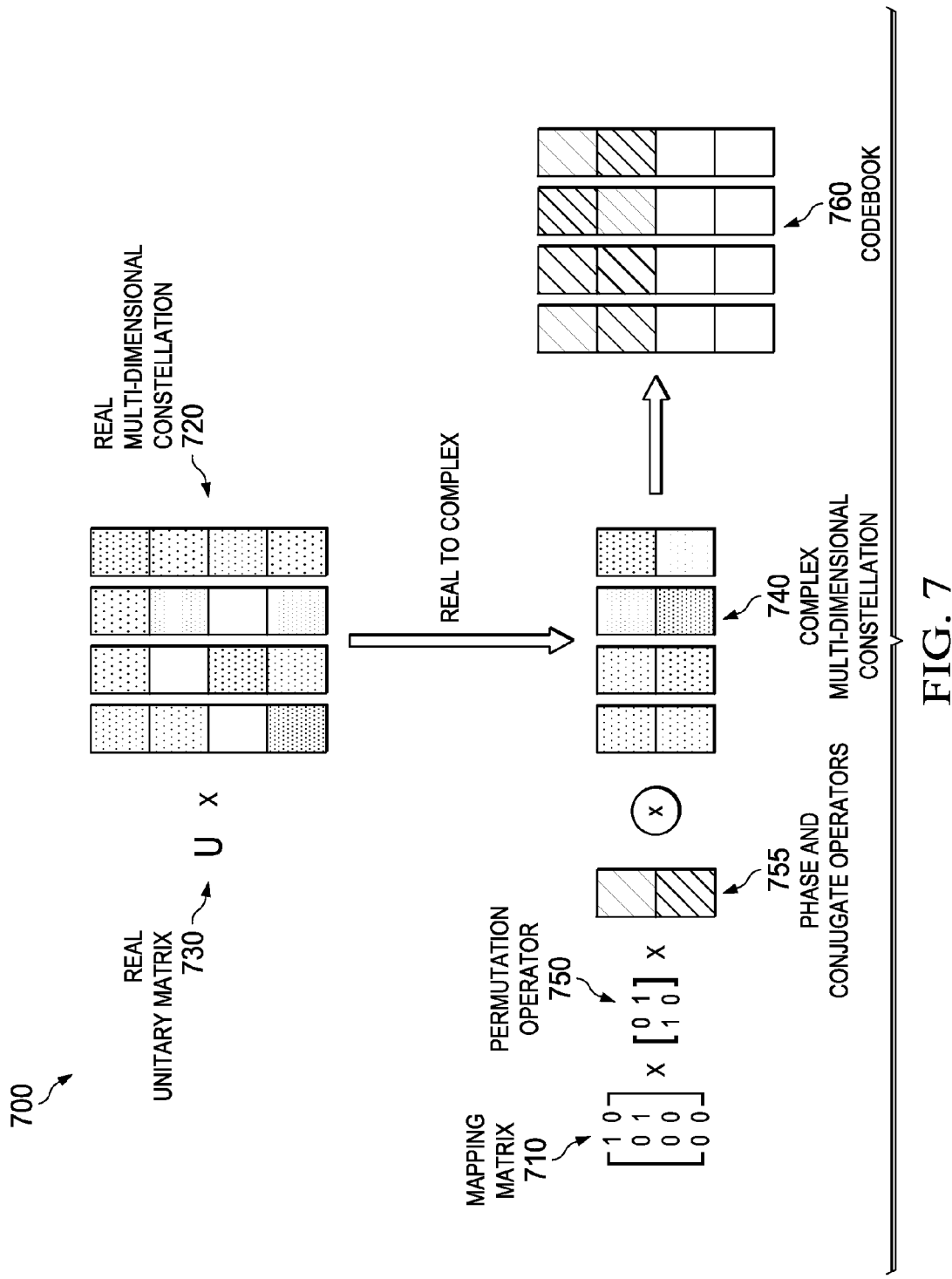
FIG. 7 illustrates a diagram of an embodiment methodology for designing a sub-optimal SCMA codebook.

Aspects of this disclosure provide sparse code multiple access (SCMA) having the following characteristics: multiple access scheme; coding gain; and sparse codewords. FIG. 7 illustrates a methodology 700 for designing a sub-optimal SCMA codebook 760. As shown, the methodology 700 includes selecting the parameters 710-755, which include a mapping matrix 710, a real multi-dimensional constellation 720, a real unitary matrix 730, a complex multi-dimensional constellation 740, a permutation operator 750, and phase and conjugate operators 755. In some embodiments, multiple mother constellations may be used to design SCMA codebooks. Additionally, the methodology 700 may include an additional step of allocating phase conjugate operators to incoming branches of the resource node. The codebook 760 is obtained by combining the parameters 710-755 in the manner depicted in FIG. 7.

Figure 8:
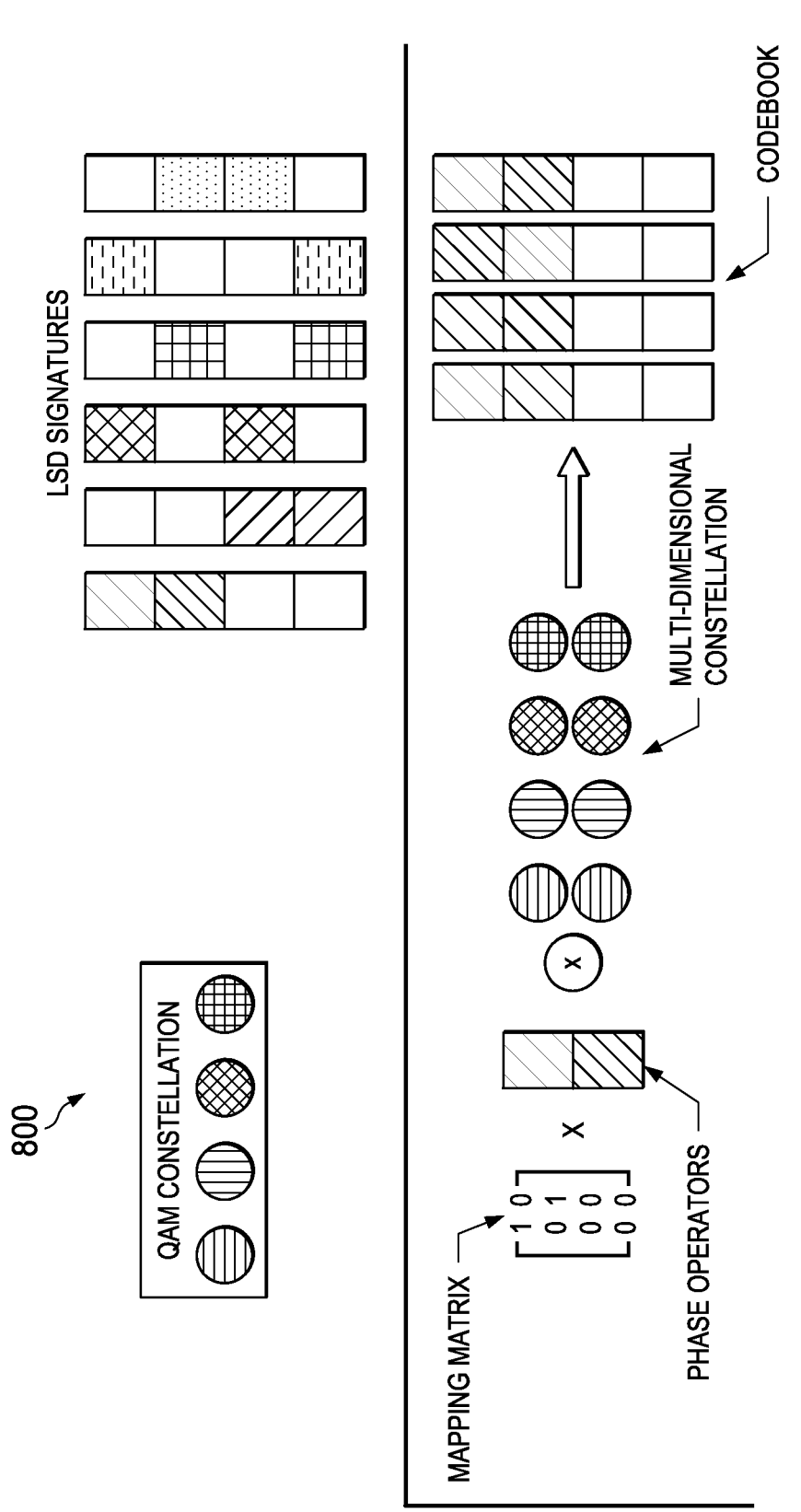
FIG. 8 illustrates a diagram of an embodiment methodology for designing LDS signatures.

In an embodiment, LDS may be considered to be a quasi-derivative of SCMA. FIG. 8 illustrates a methodology 800 for designing LDS signatures in accordance with aspects of this disclosure. In embodiments of this disclosure, the methodology 800 for designing LDS signatures may be consistent with a simplified version of SCMA design, and may exclude steps related to mother multi-dimensional constellation design (which may generally be included in SCMA design). For instance, the mother constellation may be considered a repetition of one-dimensional QAM constellation (e.g., assuming QAM constellation is give such as QPSK). Additionally, the operators may be limited to phase operators such that conjugate operators are excluded. Moreover, the methodology 800 may include a step of allocating phase operators of a resource node to its incoming branches. Aspects of the methodology 800 may be based on a linear matrix operation that is specifically designed for LDS signature design. Such a linear matrix operation may not be applied when designing SCMA codebooks.

Figure 9:
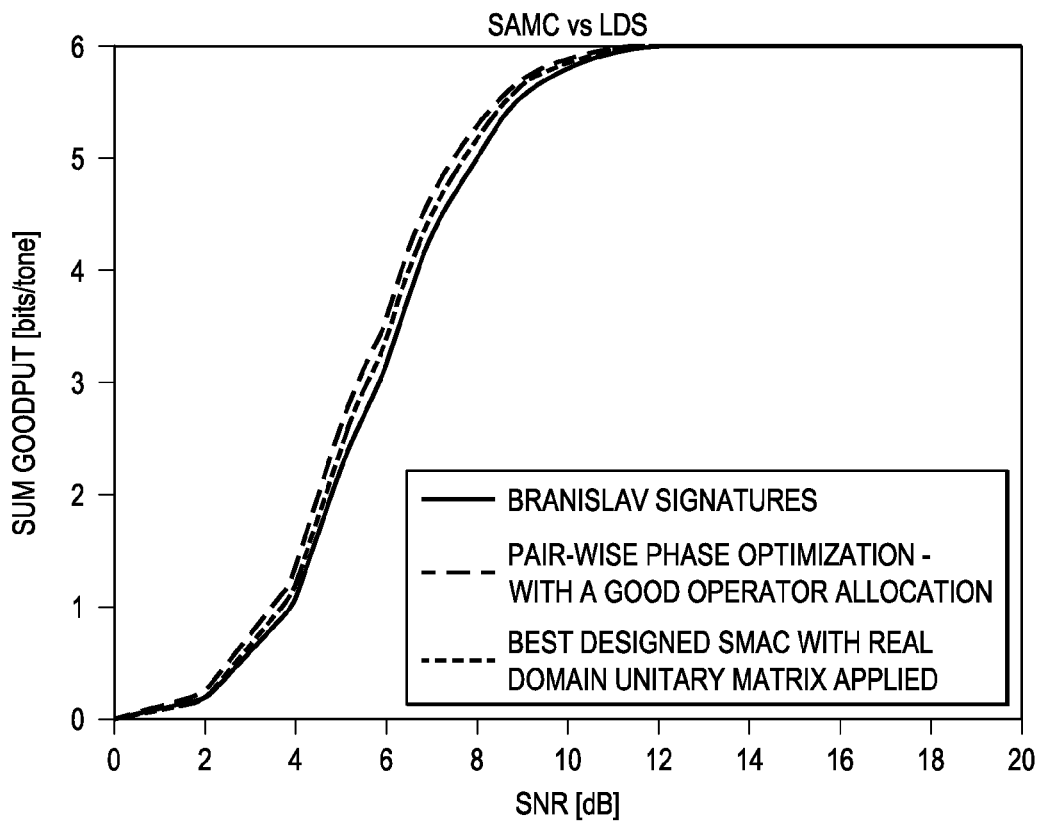
FIG. 9 illustrates a graph depicting BLER performance.

FIG. 9 illustrates a graph depicting BLER performance, which shows how the SCMA and LDS signature sets disclosed herein outperforms conventional LDS signature sets. Table 1 illustrates some distinctions between SCMA and LDS.

TABLE 1

| | SCMA | LDS |
| --- | --- | --- |
| Multiple access | ✓ Codebook domain | ✓ Signature domain |
| Sparse | ✓ Sparse codewords | ✓ Low density signatures |
| Coding gain | ✓ Data carried over multi-dimensional complex codewords | x Data carried over QMA symbols |
| Degree of freedom | J codebooks each with M codewords | J signatures |
| Receiver | Codeword-based MPA | Symbol-based MPA |

Aspects of this disclosure introduce a new class of multiple-access scheme, namely sparse code multiple-access (SCMA). Aspects of this disclosure provide a definition of sparse code multiple access (SCMA), a sub-optimal multistage design methodology for SCMA, a design methodology for LDS signatures, a symbol-based message passing algorithm for SCMA detection. Aspects of this disclosure provide numerous benefits and/or advantages, including an EXIT chart evaluation methodology adopted to SCMA and LDS structures, an SCMA is a new multiple-access scheme which can be used as a promising waveform/access technology for 5G standard, an SCMA has the potential benefit to outperform LDS, and an SCMA that has the potential to improve throughput of a wireless network or enable grant-less UL, DL, D2D, or M2M transmission. Advantages derived from this disclosure may be significant due to the sheer amount of base stations and terminals in the network.

Sparse Code Multiple Access: Sparse code multiple access (SCMA) is the proposed multiple access/coding scheme with the following properties: (i) Binary domain data are directly encoded to multi-dimensional complex domain codewords; (ii) Multiple access is achievable by generating multiple codebooks one for each layer; and (iii) Codewords of the codebooks are sparse such that the MPA multi-user detection technique is applicable to detect the multiplexed codewords with a moderate complexity.

In this disclosure, the following notations and variables are used. Sets of binary, natural, integer, real and complex numbers are denoted by $\mathbb{B}, \mathbb{N}, \mathbb{Z}, \mathbb{R}$ and $\mathbb{C}$, respectively. The symbols x, x, and X represent scalars, vectors, and matrixes, respectively. The nth element of x is denoted by $x_n$ or $(x)_n$, and $(X)_{nm} = x_{nm}$ is the element of nth row and mth column of matrix X. Also, $x_m$ is mth column of X. The transpose of x is $x^T$ and diag(x) is a diagonal matrix where its nth diagonal element is $(x)_n$. Similarly, diag(X) is a vector of the diagonal elements of matrix X. The Hermitian of a matrix is denoted by $X^H$. The variables and functions are listed in Table 22.

TABLE 2

List of variables

| No | Notation | Description | Comment |
|---|---|---|---|
| 1 | f | Function generator of an SCMA codebook | $f: \mathbb{B}^{log2(M)} \to \mathcal{X}$, x = f(b) |
| 2 | M | Number of codewords of a codebook | N/A |
| 3 | $\mathbb{B}$ | Set of binary numbers | N/A |
| 4 | x | Complex codeword of SCMA | N/A |
| 5 | b | Binary codeword | N/A |
| 6 | $\mathcal{X}$ | Codebook of a layer of an SCMA code | $|\mathcal{X}| = M$ |
| 7 | K | Length of a codeword | N/A |
| 8 | N | Number of non-zero elements of an SCMA codeword | N/A |
| 9 | $\mathcal{C}$ | Constellation set | N/A |
| 10 | g | Constellation function generator | $\mathbb{B}^{log2(M)} \to \mathcal{C}$, c = g(b) |
| 11 | V | Mapping matrix | N/A |
| 12 | $I_N$ | Identity matrix of size N × N | N/A |
| 13 | J | Number of SCMA layers | N/A |
| 14 | $S_j(V_j, g_j; M_j, N_j, K)$ | jth SCMA layer | N/A |
| 15 | $\mathcal{S}([V_j]_{j=1}^J, [g_j]_{j=1}^J; J, M, K)$ | SAMC code | |
| 16 | y | Received signal | N/A |
| 17 | $h_j$ | Channel of layer j | $h_j = (h_{1j}, \ldots, h_{Kj})^T$ |
| 18 | n | noise | $n \sim \mathcal{CN}(0, N_0 I)$ |
| 19 | $N_0$ | Noise power | N/A |
| 20 | $\lambda$ | Overloading factor | $\lambda := J/K$ |
| 21 | $f_j$ | Factor graph binary indicator of layer j | $f_j = \text{diag}(V_j V_j^T)$ |
| 22 | $d_f$ | Number of layers contributing to resource nodes | $d_f = (d_{f1}, \ldots, d_{fK})^T$ |
| 23 | F | Factor graph representation matrix | $F = (f_1, \ldots, f_J)$ |
| 24 | $\mathcal{L}_k$ | Set of layer nodes connected to resource node k | $\mathcal{L}_k = \{j | (F)_{kj} = 1, \forall j\}$ |
| 25 | $\mathcal{R}_j$ | Set of the resource nodes connected to layer node j | $\mathcal{R}_j = \{k | (F)_{kj} = 1, \forall k\}$ |
| 26 | p(.) | Probability function | N/A |
| 27 | p(.|.) | Conditional probability function | N/A |
| 28 | $\mathbf{x}^{[\mathcal{L}_k]}$ | Stack of all $x_j$'s with $j \in \mathcal{L}_k$ | N/A |
| 29 | exp(.) | Exponential function | N/A |
| 30 | $\mathcal{V}$ | Set of mapping matrices | $\mathcal{V} := [V_j]_{j=1}^J$ |
| 31 | $\mathcal{G}$ | Set of constellation function generators | $\mathcal{G} := [g_j]_{j=1}^J$ |
| 32 | m | SCMA design criterion | N/A |
| 33 | $\mathcal{V}^o$ | Optimal set of mapping matrices | $\mathcal{V}^o, \mathcal{G}^o = \arg\max_{V,G} m(\mathcal{S}(V, G; J, M, N, K))$ |
| 34 | $\mathcal{G}^o$ | Optimal set of constellation function generators | $\mathcal{V}^o, \mathcal{G}^o = \arg\max_{V,G} m(\mathcal{S}(V, G; J, M, N, K))$ |
| 35 | $V_j^{[q]}$ | It is $V_j$ after removing its all-zero rows | N/A |
| 36 | $\Delta_j$ | constellation operator of layer j | N/A |
| 37 | $\mathcal{R}$ | A real domain constellation | N/A |
| 38 | E(.) | Average energy of a constellation set | N/A |
| 39 | $U_j$ | Real domain unitary operator for layer j | N/A |
| 40 | complex(.) | Function to transfer a real vector to a complex vector with half length size | N/A |
| 41 | $N_U$ | Number of grid points to optimize a unitary matrix operator | N/A |
| 42 | $N_c$ | Number of options to transfer a real domain constellation set to a complex domain constellation set | N/A |
| 43 | $\upsilon(.)$ | Dimensional power variation of a constellation set | N/A |

TABLE 2-continued

List of variables

| No | Notation | Description | Comment |
|---|---|---|---|
| 44 | $d_{min}(\mathcal{C})$ | Minimum distance of constellation set $\mathcal{C}$ | N/A |
| 45 | $G(\mathcal{C}^+/Q)$ | Shaping gain of $\mathcal{C}^+$ over Q | $G(\mathcal{C}^+/Q) := \dfrac{d_{min}(\mathcal{C}^+)}{d_{min}(Q)} \sqrt{\dfrac{E(Q)}{E(\mathcal{C}^+)}}$ |
| 46 | $\otimes{:}\alpha$ | Scaling operator | $(\otimes{:}\alpha)z := \alpha z$ |
| 47 | $\emptyset$ | Null operator | $(\emptyset)z = z$ |
| 48 | $\odot_\tau$ | Complex conjugate operator | $(\odot{:}\tau)z := \begin{cases} z & \tau = 0 \\ z^* & \tau = 1 \end{cases}$ |
| 49 | $\odot{:}\phi$ | Phase operator | $(\odot{:}\phi)z := e^{i\phi}z$ |
| 50 | $\otimes{:}\pi$ | Permutation operator | $(\otimes{:}\pi)z = \pi z$ |
| 51 | $^n\mathcal{C}^+$ | nth dimension of constellation $\mathcal{C}^+$ | $^n\mathcal{C}^+ = \{c_{nm} \mid \forall c_m \in \mathcal{C}^+, m=1\}$ |
| 52 | p(z) | Interfering polynomials | $p(z) = \sum_{j=1}^{J} q_j(z) = \sum_{j=1}^{J} V_j \pi_j z$ |
| 53 | $\Pi$ | Set of permutation operators | $\Pi = [\pi_j]_{j=1}^{J}$ |
| 54 | n(p(z)) | Number of monomials of polynomial p(z) | N/A |
| 55 | $\mu(p(z))$ | Power variation of an interfering polynomial | $\mu(p(z)) := \dfrac{\sqrt{\sum_{n=1}^{N} d_n^2 (E(^n\mathcal{C}^+) - \overline{E})^2}}{\overline{E}}$ $E(^n\mathcal{C}^+) = \dfrac{1}{M}\sum_{m=1}^{M}|c_{nm}|^2$ $\overline{E} = \dfrac{\sum_{n=1}^{N} d_n E(^n\mathcal{C}^+)}{\sum_{n=1}^{N} d_n}$ |
| 56 | w(z) | Interfering polynomial after applying operators | N/A |
| 57 | $D_{pair}(.,.)$ | Minimum distance of two constellation sets | N/A |
| 58 | $\Omega_k^{l+}$ | Optimized phase/conjugate operators for resource node k with given permutation set | $\Omega_k^{l+} = \{\{\omega_{k1u}^{l+}\}_{u=1}^{d_{k1}^{l+}}, \ldots, \{\omega_{kNu}^{l+}\}_{u=1}^{d_{kN}^{l+}}\}$ |
| 59 | S | Signature matrix of LDS | $S = [s_j]_{j=1}^{J}$ |
| 60 | q | QAM constellation function generator | $q: \mathbb{B}^{log_2 M} \to Q \subset \mathbb{C}$, $q = q(b)$ |
| 61 | Q | QAM constellation | N/A |
| 62 | $\mathcal{L}([s_j]_{j=1}^{J}, q; J, M, N, K)$ | LDS structure | N/A |
| 63 | $1_N$ | All-one vector of size N | N/A |
| 64 | phase(.) | Phase of a complex number | $phase(ae^{i\theta}) = \theta, a, \theta \in \mathbb{R}$ |
| 65 | $S^\dagger$ | Pseudo inverse of S | N/A |
| 66 | $N_1$ | Power of transformation noise for MPA of LDS | N/A |

Disclosure below include descriptions of the SCMA code structure, techniques and mechanisms for MPA detection for SCMA, discussions of optimization problems/issues for SCMA code design, and procedures of multi-stage sub-optimal SCMA code design. Additional disclosures describe how SCMA codes can be evaluated based on the link-level and EXIT chart evaluation methodologies.

An SCMA encoder may be defined as follows: $f: \mathbb{B}^{log_2(M)} \to X$, $x = f(b)$ where $X \subset \mathbb{C}^K$ with cardinality $|X| = M$. The K-dimensional complex codeword x is a sparse vector with $N < K$ non-zero entries. Let c denote a N-dimensional complex constellation point defined within the constellation set $\mathcal{C} \subset \mathbb{C}^N$ such that: $\mathbb{B}^{log_2(M)} \to \mathcal{C}$, $c = g(b)$. An SCMA encoder can be redefined as $f = Vg$ where the binary mapping matrix $V \in \mathbb{B}^{K \times N}$ simply maps the N dimensions of a constellation point to a K-dimensional SCMA codeword. Note that V contains K−N all-zero rows. Eliminating the all-zero rows from V, the reset can be represented by identity matrix $I_N$ meaning that the binary mapper does not permute the dimensions of subspace $\mathcal{C}$ during the mapping process.

An SCMA encoder contains J separate layers each defined by $\mathcal{S}_j(V_j, g_j; M_j, N_j, K)$ $j = 1, \ldots, J$. The constellation function $g_j$ generates the constellation set $\mathcal{C}_j$ with $M_j$ alphabets of length $N_j$. The mapping matrix $V_j$ maps the $N_j$-dimensional constellation points to SCMA codewords to form codeword set $X_j$. Without loss of generality, it can be assumed that all layers have the same or similar constellation size and length, i.e. $M_j = M$, $N_j = N$, $\forall j$. Summarizing, an SCMA code can be represented by $\mathcal{S}([V_j]_{j=1}^{J}, [g_j]_{j=1}^{J}; J, M, N, K)$. SCMA codewords are multiplexed over K shared orthogonal (or near orthogonal) resources (e.g. OFDMA tones or MIMO spatial layers). The received signal after the synchronous layer multiplexing can be expressed as: $y=\sum_{j=1}^{J} \text{diag}(h_j)x_j+n=\sum_{j=1}^{J}\text{diag}(h_j)V_j g_j(b_j)+n$, where $x_j=(x_{1j},\ldots,z_{Kj})^T$ is the SCMA codeword of the layer j, $h_j=(h_{1j},\ldots,h_{Kj})^T$ is the channel vector of layer j and $n\sim\mathcal{CN}(0, N_0 I)$ is the background noise. In the case that all the layers are transmitted from the same transmit point, all the channels are identical $h_j=h$, $\forall j$ and hence the above equation is reduced to $y=\text{diag}(h)\sum_{j=1}^{J} x_j+n$. By multiplexing J layers over K resources, the overloading factor of the code is defined as $\lambda:=J/K$.

A received signal at the resource k may be represented as $y_k=\sum_{j=1}^{J} h_{kj}x_{kj}+n_k$, $k=1,\ldots,K$. As the codewords $x_j$'s are sparse, only a few of them collide over the resource k. The set of the resources occupied by the layer j depends on the mapping matrix $V_j$ and the set is determined by the index of the non-zero elements of the binary indicator vector $f_j=\text{diag}(V_j V_j^T)$. The total number of layers contributing to the resources is determined by $d_f=(d_{f1},\ldots,d_{fK})^T=\sum_{j=1}^{J} f_j$. The whole structure of SCMA code $\mathcal{S}$ can be represented by a factor graph matrix defined as $F=(f_1,\ldots,f_J)$. Layer j and resource k are connected if and only if $(F)_{kj}=1$. The set of the layer nodes connected to the resource node k is defined as $\mathcal{L}_k=\{j|(F)_{kj}=1, \forall j\}$ for $\forall k$. Alternatively, the set of the resource nodes connected to the layer node j is $\mathcal{R}_j=\{k|(F)_{kj}=1, \forall k\}$ for $\forall j$. Based on the factor graph definition, the received signal at the resource k can be rewritten as follows: $y_k=\sum_{j\in\mathcal{L}_k} h_{kj}x_{kj}+n_k$, $\forall k$. Notably, that the factor graph parameters F, $[V_j]_{j=1}^{J}$, $[\mathcal{L}_k]_{k=1}^{K}$, and $[\mathcal{R}_j]_{j=1}^{J}$ may all represent the same information but in the different formats.

The following described MAP detection as may be performed by the SCMA Receiver, and is discussed in Reza Hoshyar, Ferry P. Wathan, Rahim Tafazolli, "*Novel Low-Density Signature for Synchronous CDMA Systems Over AWGN Channel*," IEEE trans. on signal processing, vol. 56, No. 4, pp. 1616, April 2008, which is incorporated by reference herein as if reproduced in its entirety. Given the received signal y and the channel knowledge $\{h_j\}_{j=1}^{J}$ the joint optimum MAP detection of layer codewords $X=(x_1,\ldots,x_J)$ can be expresses as:

$$\hat{X} = \text{argmax}_{X\in(\times_{j=1}^{J})X_j} p(X|y),$$

where $(x_{j=1}^{J})X_j:=X_1 x \ldots x X_J$. The transmitted codeword of layer j can be estimated by maximizing the marginal of the joint probability, which may be given by $$\hat{x}_j = \text{argmax}_{a\in X_j} \sum_{\substack{X\in(\times_{j=1}^{J})X_j \\ x_j=a}} p(X|y), \forall j.$$

$\forall j$.

According to Bays' rule, the conditional probability above can be rewritten as $$(X|y) = \frac{p(y|X)P(X)}{p(y)} \propto p(y|X)P(X),$$

where $P(X)=\Pi_{j=1}^{J} P(x_j)$ is the joint a priori information of all the statistically independent layers. Assuming uncorrelated data over layers, $p(y|X)$ can be factorized as $p(y|X)=\Pi_{k=1}^{K} p(y_k|X)$ Due to sparse codewords, $Y_k$ depends only on the layers that are connected to the resource node k. Therefore, $p(y|X)$ can be further reduced to $p(y|X)=\Pi_{k=1}^{K} p(y_k|\mathbf{X}^{[\mathcal{L}_k]})$ where $\mathbf{X}^{[\mathcal{L}_k]}$ is the stack of all $x_j$'s with $j\in\mathcal{L}_k$. If all the layer nodes interfere at resource k, or equivalently $\mathcal{L}_k=\{1,\ldots,J\}$, then $\mathbf{X}^{[\mathcal{L}]}=X$. Combining the above formulas and considering the fact that layer j depends only on the resource nodes belonging to $\mathcal{R}_j$, the estimate of layer j can be described as $$\hat{x}_j = \text{argmax}_{a\in X_j} \sum_{\substack{X\in(\times_{j=1}^{J})X_j \\ x_j=a}} P(X)\prod_{k\in\mathcal{R}_j} p(y_k|\mathbf{X}^{[\mathcal{L}_k]}),$$

$\forall j$, in which $$p(y_k|\mathbf{X}^{[\mathcal{L}_k]}) \propto \exp\left(-|y_k - \frac{\sum_{j\in\mathcal{L}_k} h_{kj}x_{kj}|^2}{N_0}\right).$$

The above equation turns the original joint MAP detection problem to the marginalize product of functions problem which is much simpler to resolve.

MPF problem may not have a brute force solution with moderate complexity, but the near optimal solution of the problem can be found iteratively by applying the Message Passing Algorithm MPA over the underlying factor graph.

Message update at a resource node: Let $p_{j\to k}(x_j=a)$ denote a message passed from layer node j to resource node k about the reliability of layer j taken codeword $a\in X_j$. In general, a branch that connects layer node j and resource node k carries $|X_j|=M_j=M$ reliability values for every possible codeword belonging to $X_j$. Resource node k updates and returns the reliability values as follows:

$$p_{j\leftarrow k}(x_j=a) = \sum_{\mathbf{B}^{[\mathcal{L}_k]}\in(\times_{i\in\mathcal{L}_k})X_i, b_j=a} p(y_k|\mathbf{B}^{[\mathcal{L}_k]}) \prod_{\substack{i\in\mathcal{L}_k \\ i\neq j}} p_{i\to k}(x_i=b_i),$$

$\forall k, \forall a\in X_j, \forall j\in\mathcal{L}_k$.

The complexity of the receiver mainly depends on the number of combinations in the above equation. The number of the combinations at resource node k is $M^{d_{fk}}$ which exponentially grows with the constellation size and the number of interfering layers. The extrinsic information $p_{j\leftarrow k}(x_j=a)$ needs to be normalized before being passed from the resource node to the connected layer node, e.g., $$p_{j\leftarrow k}(x_j=a) \leftarrow \frac{p_{j\leftarrow k}(x_j=a)}{\sum_{b\in X_j} p_{j\leftarrow k}(x_j=b)},$$

$\forall k, \forall a\in X_j, \forall j\in\mathcal{L}_k$.

Message update at a layer node. Let the a priori information about the codewords of layer j be represented by $ap_j(x_j=a)$, ∀a∈$X_j$. The branch information is updated at layer node j based on the following formula.

$$p_{j \to k}(x_j = a) = ap_j(x_j = a)\prod_{\substack{u \in \mathcal{R}_j \\ u \neq k}} p_{j \leftarrow u}(x_j = a),$$

∀j, ∀a∈$X_j$, ∀k∈$\mathcal{R}_j$, which is normalized as:

$$p_{j \to k}(x_j = a) \leftarrow \frac{p_{j \to k}(x_j = a)}{\sum_{b \in \chi_j} p_{j \to k}(x_j = b)},$$

∀j, ∀a∈$X_j$, ∀k∈$\mathcal{R}_j$.

Output probability of codewords: Messages are passed iteratively between the layer and resource nodes and after convergence the extrinsic probabilities of the codewords of each layer is calculated as follows: $p(x_j=a) = \prod_{u \in \mathcal{R}_j} p_{j \leftarrow u}(x_j=a)$, ∀j, ∀a∈$X_j$. This equation can be normalized as $$p(x_j = a) \leftarrow \frac{p(x_j = a)}{\sum_{b \in \chi_j} p(x_j = b)}, \forall j, \forall a \in \chi_j.$$

∀j, ∀a∈$X_j$.

The design problem of an SCMA code with a given structure of $\mathcal{S}$ (V, G; J, M, N, K) where V:=$[V_j]_{j=1}^J$ and G:=$[g_j]_{j=1}^J$ can be given as $V^o, G^o$=arg max$_{V,G}$ m($\mathcal{S}$ (V, G; J, M, N, K)), where m is a given design criterion. As the solution of this multi-dimensional problem is not straightforward, a multi-stage optimization approach is proposed to achieve a sub-optimal solution for the problem.

As a general multi-stage design methodology, a sparse codebook is generated by: First generating multi-dimensional modulation constellation(s); and then transferring the constellation(s) to multiple sparse codebooks. Following the above two major steps, below is detail description of a design methodology for SCMA:

As described before, the set of mapping matrices V may determine the number of layers interfering at each resource node which in turn it defines the complexity of the MPA detection. The sparser the codewords are the less complex is the MPA detection. The mapping matrices design rules may be defined as follows: (1) $V_j \in \mathbb{B}^{K \times N}$; (2) $V_i \neq V_j$, ∀i≠j; and (3) $V_j^{[\varnothing]} = I_N$ where $V_j^{[\varnothing]}$ is $V_j$ after removing its all-zero rows.

The unique solution $V^+$ to the above problem is simply determined by inserting K−N all-zero row vectors within the rows of $I_N$. The properties of the solution may be as follows:

$$J = \binom{K}{N}; \quad (1)$$

$$d_{fj} = d_f = \binom{K-1}{N-1} = \frac{JN}{K}, \forall j; \quad (2)$$

$$\lambda = \frac{J}{K} = \frac{d_f}{N}; \quad (3)$$

and (4) max(0,2N−K)≤l<N−1, where l is the number of the overlapping elements of any two distinct $f_j$ vectors.

As an example, when considering complexity, N should be small enough in comparison with K to maintain a reasonable level of sparsity. In particular, if N=2, two dimensional constellation points can be mapped over K>2 resources to construct SCMA codewords with a minimum interfering layer nodes. The mapping properties are as follows:

$$N = 2; J = \binom{K}{2} = \frac{K(K-1)}{2}. \quad (1)$$

J=6 for K=4;

$$d_{fj} = d_f = \binom{K-1}{1} = K - 1, \forall j. \quad (2)$$

∀j. $d_f$=3 for K=4;

$$\lambda = \frac{J}{K} = \frac{K-1}{2}. \quad (3)$$

λ=1.5 for K=4; and (4) 0≤l≤1 if K=4, meaning that the codewords are either totally orthogonal with no overlaps or they collide only over one non-zero element.

$$F = \begin{bmatrix} 1 & 1 & 1 & 0 & 0 & 0 \\ 1 & 0 & 0 & 1 & 1 & 0 \\ 0 & 1 & 0 & 1 & 0 & 1 \\ 0 & 0 & 1 & 0 & 1 & 1 \end{bmatrix} \text{ for } K = 4$$

Figure 10:
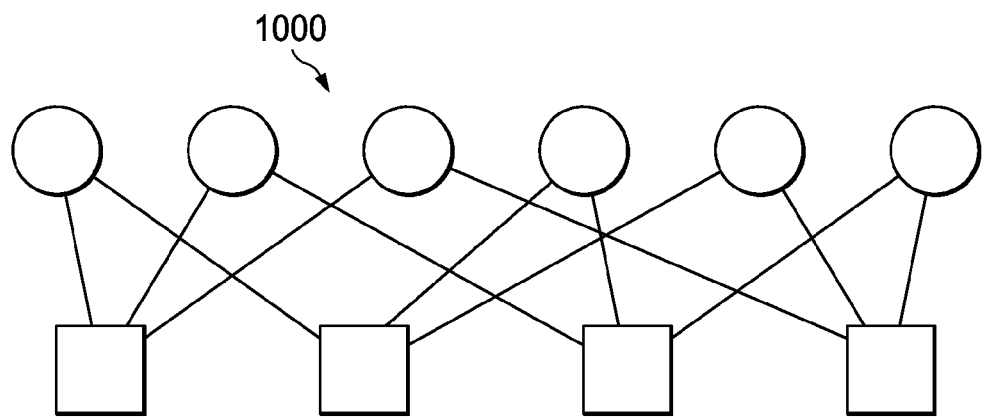
FIG. 10 illustrates a diagram of a factor graph representation of an SCMA code.

FIG. 10. Illustrates a factor graph 1000 representing F in relation to constellation points. Having the mapping set $V^+$, the optimization problem of an SCMA code is reduced to $G^+$=arg max$_G$ m($\mathcal{S}$ ($V^+$, G; J, M, N, K)).

One problem may be to define J different N-dimensional constellations each containing M points. To simplify the optimization problem, the constellation points of the layers are modeled based on a mother constellation and the layer-specific operators, i.e. $g_j$≡($\Delta_j$)g, ∀j, where $\Delta_j$, denotes a constellation operator. According to the model, the SCMA code optimization turns into $$g^+, [\Delta_j^+]_{j=1}^J = \text{argmax}_{g,[\Delta_j]_{j=1}^J} m(\mathcal{S}(V^+, \mathcal{G} = [(\Delta_j)g]_{j=1}^J; J, M, N, K)).$$

In general, there might be multiple mother constellations instead of one: $g^{(1)}, g^{(2)}, \ldots, g^{(L)}$ and the constellation of a layer might be built up on one of the available mother constellations, i.e., $g_j$≡($\Delta_j$)$g^{(m_j)}$ and 1≤m_j≤L. In the following, we assume only one mother constellation exist. It is straightforward to extent the design methodology to the case that multiple mother constellations exist. As a suboptimal approach to the above problem, the mother constellation and the operators may be determined separately.

For a mother multi-dimensional constellation, the design of a real domain constellation may be described as follows. The target may be to design a multi-dimensional compact constellation that minimizes the average alphabet energy for a given minimum Euclidian distance between the constellation points. We first consider a 2N-dimensional real-valued AWGN channel. With an even value of 2N the results can easily be transferred to a N-dimensional complex valued AWGN channel. For a given pair (2N, M), the goal is to find the minimum energy constellation $\mathcal{R} = \{r_1, \ldots, r_M\}$, with $r_m \in \mathbb{R}^{2N}$ for $m=1, \ldots, M$, while keeping the Euclidian distance between different points (alphabets) greater or equal to a certain threshold D, ($d_{min}(\mathcal{R})=D$). The constellation $\mathcal{R}$ is a point in the space $\mathcal{M} = \{(r_1, \ldots, r_M) | \|r_n - r_m\|^2 \geq D^2, 1 \leq n \leq m \leq M\}$. Following this approach, we are led to define the merit function: $\epsilon: \mathcal{M} \to \mathbb{R}$ and $\mathcal{R} = \{r_1, \ldots, r_M\} \to \epsilon(\mathcal{R})$, where $\epsilon(\mathcal{R}) = \sum_{m=1}^{M} \|r_m\|^2$. Clearly, $\epsilon(\mathcal{R})$ is proportional to the average symbol energy $$E(\mathcal{R}) = \frac{\epsilon(\mathcal{R})}{M}.$$

Constructing an optimal codebook $\mathcal{R}$ corresponds to solving the optimization problem $\mathcal{R}^+ = \arg\min_{\mathcal{R} \in \mathcal{M}} \epsilon(\mathcal{R})$.

Arbitrary real values of symbols $r_1, \ldots, r_m$ are allowed. The problem defined above is a non-convex optimization problem since all the constraints in the set $\mathcal{M}$ are nonconvex. More precisely, it belongs to the class of nonconvex quadratically constrained quadratic programming (QCQP) problems. Non-convex QCQP is a well known problem in the optimization literature with many applications. The non-convex QCQP is NP-hard. Consequently, it is generally difficult to solve a QCQP, even for a small number of constraints.

A suboptimal solution is proposed in Marko Beko and Rui Dinis, "*Designing Good Multi-Dimensional Constellations*," IEEE wireless communications letters, vol. 1, No. 3, pp. 221-224, June 2012, which is incorporated herein by reference as if reproduced in its entirety. The suboptimal solution proposed by the above mentioned reference is based on the reformulation/linearization-based methods also known as the convex-concave procedure (CCP). The formulated non-convex optimization problem is tackled by solving a sequence of convex optimization problems where it minimizes the convex quadratic objective function subject to a set of linear inequalities.

Regarding unitary operations on a real-domain constellation; Once the mother real constellation is known, unitary operations can be applied directly on the mother constellation to construct an SCMA code. The design problem is expressed as follows:

$$[U_j^+]_{j=1}^J = \arg\max_{[U_j]_{j=1}^J} m\left(\mathcal{S}\left(V^+, \mathcal{G} = [\text{complex}(U_j r^+)]_{j=1}^J; J, M, N, K\right)\right).$$

where $r^+$ is the function generator of $\mathcal{R}^+$, $U_j$ is a $2N \times 2N$ unitary matrix, and complex($\cdot$) is a function combining every two consecutive real dimensions to form a complex dimension. Each unitary matrix has $$\binom{2N}{2} = N(2N-1)$$

degrees of freedom. The unitary parameters are uniformly distributed in $[-\pi.\pi)$ interval if a unitary matrix is represented by given rotation matrices. Based on the above optimization problem, there are $N(2N-1)J-1$ independent variables to be optimized. If every variable is selected from a grid with $N_U$ points over $[-\pi.\pi)$, an exhaustive search approach requires $N_U^{N(2N-1)J-1}$ trials. As a relatively simple example, for $N=2$, $J=6$, and $N_U=100$, the total number of the exhaustive search trials is $10^{70}$. Assuming a processor can handle $10^{10}$ trials per second (a very high end processor), it takes more than 3e52 years to check every possible hypothesis and determine the optimal one! The problem is even more complex when a larger SCMA code is desired.

The rest of the SCMA code design may be dedicated to a suboptimal approach which is practically affordable and at the same time it is not that far from the unknown optimal solution. The basic idea of the near-optimal solution is as follows: (1) The real-domain constellation is transferred to the complex domain based on a given criterion. The complex domain constellation is used as a mother constellation; and (2) The constellation of each layer is constructed based on some serially concatenated operators applied on the mother constellation.

Complex domain constellation: Real constellation $\mathcal{R}^+$ can be easily converted to complex constellation $\mathcal{C}^+$ by pairing any two real dimensions to form a complex dimension. The $2N$ real dimensions can be paired in $N_c = \Pi_{n=1}^{N}(2N-2n+1)$ different ways. Among the available pairing options, the one is selected with the maximum power variance across the complex dimensions, for instance using:

$$\mathcal{C}^+ = \underset{\substack{\mathcal{C} \text{ is one} \\ \text{of } N_C \text{ pairing} \\ \text{options of } \mathcal{R}^+}}{\arg\max} \; v(\mathcal{C}),$$

where $$v(\mathcal{C}) = \sum_{n=1}^{N} \sum_{m=1}^{M} \left(|c_{nm}|^2 - \frac{1}{N}\|c_m\|^2\right)^2.$$

The power variation over constellation dimensions helps the SIC property of a MPA detector to better remove the power variant interfering signals arriving from different colliding layers to a resource node. The reasoning behind this optimization criterion is further described below. Note that the complex transform from $\mathcal{R}$ to $\mathcal{C}$ does not change the constellation properties, i.e. $E(\mathcal{C})=E(\mathcal{R})$ and $d_{min}(\mathcal{C})=d_{min}(\mathcal{R})$.

For example, let $N=2$ and $M=4$. The real $2N=4$-dimensional solution is determined as follows:

$$\mathcal{R}^+ = \begin{bmatrix} -0.7586 & +0.2626 & -0.2583 & +0.7543 \\ -0.1274 & -0.8822 & +0.6244 & +0.3852 \\ -0.1835 & +0.1707 & +0.4121 & -0.3993 \\ +0.6120 & -0.3517 & -0.6113 & +0.3509 \end{bmatrix},$$

with $E(\mathcal{R}^+)=1$ and $d_{min}(\mathcal{R}^+)=1.6330$. The 4 real dimensions can be combined in 3 different ways. In $v(\cdot)$ sense, the best 2-dimensional complex solution is defined as follows:

$$\mathcal{C}^+ = \left\{ \begin{bmatrix} -0.7586-0.1274i \\ -0.1835+0.6120i \end{bmatrix}, \begin{bmatrix} +0.2626-0.8822i \\ +0.1707-0.3517i \end{bmatrix}, \begin{bmatrix} -0.2583+0.6244i \\ +0.4121-0.6113i \end{bmatrix}, \begin{bmatrix} +0.7543+0.3852i \\ -0.3993+0.3509i \end{bmatrix} \right\},$$

with $$E(\mathcal{C}^+) = 1 \text{ and } \frac{d_{min}(\mathcal{C}^+)}{\sqrt{E(\mathcal{C}^+)}} \simeq 1.633.$$

The dimensional power variation is quantified as $$\frac{N}{E(\mathcal{C}^+)}\sqrt{\frac{1}{NM}\mathcal{V}(\mathcal{C}^+)} \simeq 0.4220.$$

If the constellation alphabets are built upon a QPSK constellation in a traditional CDMA way (Here the CDMA spreading sequence is simply $$\frac{\sqrt{2}}{2}(1 i)^T$$

and the QPSK constellation set is $$\left\{\pm\frac{\sqrt{2}}{2} \pm \frac{\sqrt{2}}{2}i\right\},$$

one can come up with the following typical example:

$$Q = \left\{\begin{bmatrix} +0.5+0.5i \\ -0.5+0.5i \end{bmatrix}, \begin{bmatrix} -0.5+0.5i \\ -0.5-0.5i \end{bmatrix}, \begin{bmatrix} -0.5-0.5i \\ +0.5-0.5i \end{bmatrix}, \begin{bmatrix} +0.5-0.5i \\ +0.5+0.5i \end{bmatrix}\right\}$$

in which E(Q)=1, $$\frac{d_{min}(Q)}{\sqrt{E(Q)}} = \sqrt{2},$$

and ν(Q)=0. The gain of the multi-dimensional constellation optimization is defined as $$G(\mathcal{C}^+/Q) := \frac{d_{min}(\mathcal{C}^+)}{d_{min}(Q)}\sqrt{\frac{E(Q)}{E(\mathcal{C}^+)}}$$

which is around 1.25 dB for this particular example. The gain on the minimum Euclidian distance can be potentially translated to the SNR and diversity gains for the BLER performance of an SCMA code. At the same time, the dimensional power variation of $\mathcal{C}^+$ is an advantage for $\mathcal{C}^+$. More details on the impact of the dimensional power variation are provided below.

After optimizing the constellation set $\mathcal{C}^+$, the corresponding constellation function $g^+$ is defined to setup the mapping rule between the binary words and the constellation alphabet points. For example, following the Gray mapping rule, the binary words of any two closet constellation points can have a Hamming distance of 1. As an alternative, after construction of the codebooks for all layers, the binary mapping rule of each of the layer codebooks can be set separately.

Constellation function operators: by having a solution for the mother constellation ($\mathcal{C}^+$ or equivalently $g^+$), the original SCMA optimization problem is further reduced to:

$$[\Delta_j^+]_{j=1}^J = \text{argmax}_{[\Delta_j]_{j=1}^J} m(\mathcal{S}(\mathcal{V}^+, \mathcal{G} = [(\Delta_j)g^+]_{j=1}^J; J, M, N, K)).$$

The definition of the operators and their optimization strategy are described below.

With respect to constellation operators, let δ denote an operator applied on z∈ℂ. The operation is denoted by (δ)z. Three typical operators are scaling, complex conjugate and phase rotation. The scaling operator ⊗:π is expressed as (⊗:α)z:=αz. A null operator is represented by (ø)z=z. The complex conjugate operator is defined as below $$(\circledast : \tau)z := \begin{cases} z & \tau = 0, \\ z^* & \tau = 1, \end{cases}$$

and also the phase operator is defined as (⊙:φ)z:=$e^{i\phi}$z. A scalar operator can be extended to a vector operator. Let $\Delta=(\delta_1, \ldots, \delta_N)^T$ is applied on $z=(Z_1, \ldots, Z_N)^T \in \mathbb{C}^N$. By definition, $(\Delta)z=((\delta_1)Z_1, \ldots, (\delta_N)z_N)^T$. Similarly, a matrix operator $\Psi\gamma=[\gamma_{nm}]$ can be defined as $(\Psi)z=r$, where $(r)=r_n=r_n=\Sigma_{m=1}^N(\gamma_{nm})z_m, \forall n$.

Vector permutation is an example of a matrix operator which can be simply defined as $(\otimes: \pi)z=\Sigma_{m=1}^N)\otimes:\pi_{nm})z_m=\Sigma_{m=1}^N\pi_{nm}z_m=\pi z$, where π is a permutation matrix. Multiple operators can be serially concatenated. For example, ($\otimes \odot (\circledast): \pi\phi\tau)z=(\otimes: \pi)(\odot: \phi)(\circledast: \tau)z=\pi\text{diag}(e^{i\phi})(\circledast): \tau):z$.

Operators can be applied on a constellation function generator g: $\mathbb{B}^{log_2 M} \to \mathcal{C}$ with c=g(b). Function (Δ)g is defined as $(\Delta)g: \mathbb{B}^{log_2 M} \to (\Delta)\mathcal{C}$ with $c_\Delta=(\Delta)g(b)$ where $(\Delta)\mathcal{C}=\{c_\Delta=(\Delta)c|\forall c \in \mathcal{C}\}$. In the process of an SCMA code design, we need those types of constellation operators that do not change the basic properties of the constellation set. It can be easily shown that permutation, phase rotation, and conjugate operators hold the original properties of a constellation. In other words, $p((\otimes \odot (\circledast): \pi\phi\tau)\mathcal{C})=p(\mathcal{C})$ for p∈{E, $d_{min}$, ν}.

As mentioned before, the constellation of the different SCMA layers are constructed based on the mother constellation g and a layer-specific operator $\Delta_j$ for layer j A layer-specific operator is defined as $\Delta_j=\otimes \odot (\circledast): \pi_j\phi_j\tau_j$.

Regarding optimization of constellation operators, when modeling the constellation operators as above, the optimization problem of an SCMA code can be rewritten as follows $$[\pi_j^+]_{j=1}^J, [\varphi_j^+]_{j=1}^J,$$
$$[\tau_j^+]_{j=1}^J = \text{arg}\max_{[\pi_j]_{j=1}^J,[\varphi_j]_{j=1}^J,[\tau_j]_{j=1}^J} m(\mathcal{S}(\mathcal{V}^+\mathcal{G} = [(\otimes \odot \circledast : \pi_j\varphi_j\tau_j)g^+]_{j=1}^J;$$
$$J, M, N, K)).$$

Let $^n\mathcal{C}^+=\{c_{nm}=(c_m)_n|\forall c_m \in \mathcal{C}^+, m=1, \ldots, M\}, \forall n=1, \ldots, N$ denote the nth dimension of the mother constellation. Also assume that $z^n \in ^n\mathcal{C}^+$. An arbitrary alphabet of the mother codeword can be represented by $z=(z, z^2, \ldots, z^N)^T$. Let for this moment the constellation operator of layer j is limited to the permutation matrix $\pi_j$. Under these assumptions, the SCMA codeword of layer j is expressed as $x_j=q_j(z)=V_j\pi_j z$. Considering AWGN channel, the aggregate receive signal is $p(z)=\sum_{j=1}^{J} q_j(z)=\sum_{j=1}^{J} V_j \pi_j z$, where $p(z)=(p_1(z), \ldots, p_K(z))^T$ is a K×1 vector in which element $p_k(z)$ represents the interfering polynomial of resource node k. An interfering polynomial can be modeled as $p_k(z)=d_{k1}z+d_{k2}z^2+\ldots+d_{kN}z^N$ where $\forall k, n, d_{kn} \in \mathbb{N}$. As the number of the interfering layers per resource node is $d_f$, one can conclude that $\sum_{n=1}^{N} d_{kn}=d_f, \forall k$. As an example, for N=2 and $d_f=3$ the interfering polynomial of layer 1 can be $p_1(z)=2z+z^2$ meaning that the first resource node takes 3 interfering layers where two of them are from the first dimension of the mother constellation and the third element is selected from the second dimension of the mother constellation. In general, for a given mapping matrix set V, the pattern of $d_{kn}$, $\forall k, n$ depends on the permutation set $\Pi=[\pi_j]_{j=1}^{J}$. There is a one-to-one mapping between p(z) and $\Pi$ but there is a chance that two different permutation sets lead to the identical interfering polynomials for any two resource nodes. The total number of the constellation permutation choices is $(N!)^J$ while the total number of the distinct interfering polynomials is just limited to $$\binom{d_f + N - 1}{d_f}.$$

By looking at the interfering polynomial p(z) (k is dropped for the sake of simplicity), the different dimensions of the mother constellation might interfere at a resource node. The task of the MPA detector is to separate the interfering symbols in an iterative fashion. As a basic rule, interfering symbols are more easily separated if their power level is more diverse. Intuitively, the strongest symbol is first detected (or its corresponding reliability value is converged) and then it helps the rest to be detected by removing the next strongest symbols, consecutively.

Based on this reasoning, the mother constellation must have a diverse average power level over the constellation dimensions, i.e. $v(\mathcal{C}^+)$ must be maximized when $\mathcal{R}^+$ dimensions are paired to form the complex domain constellation. This is the rule which is discussed below for designing the mother complex constellation. Assuming the dimensional power level of the mother constellation is diverse enough, the permutation set must be selected in a way that it captures as much as power diversity over the interfering layers. The power variation over the layers of an interfering polynomial can be quantified and optimized by following one of the two approaches described as follows: For a given interfering polynomial p(z), the number of non-zero coefficients is a simple indicator of the power variation over the interfering layers. For example, if N=2 and $d_f=3$, we prefer $p(z)=2z+z^2$ or $p(z)=z+2z^2$ rather than $p(z)=3z$ or $p(z)=3z^2$. In the later ones, all three symbols are from the same dimension hence their power variation is actually zero. Let n(p(z)) denote the number of non-zero coefficients (or equivalently the number of monomials) of p(z).

The design criterion of the permutation set is defined as follows: $\{\Pi^{1+}, \Pi^{2+}, \ldots\}=\arg\max_\Pi \min_k n(p_k(z))$. As indicated above, there might be more than one solution for the above optimization problem. More precisely, the actual power variation of $p(z)=d_1z+d_2z^2+\ldots+d_Nz^N$ can be quantified as follow:

$$\mu(p(z)) := \frac{\sqrt{\sum_{n=1}^{N} d_n^2 (E(n\mathcal{C}^+) - \bar{E})^2}}{\bar{E}},$$

where $$E(n\mathcal{C}^+) = \frac{1}{M}\sum_{m=1}^{M} |c_{nm}|^2,$$

and $$\bar{E} = \frac{\sum_{n=1}^{N} d_n E(n\mathcal{C}^+)}{\sum_{n=1}^{N} d_n} = \frac{\sum_{n=1}^{N} d_n E(n\mathcal{C}^+)}{d_f}.$$

The design problem is described as $\{\Pi^{1+}, \Pi^{2+}, \ldots\}=\arg\max_\Pi \min_k \mu^2(p_k(z))$. Assume $\Pi^{l+} \in \{\Pi^{1+}, \Pi^{2+}, \ldots\}$ is a candidate solution for the permutation operator led to p(z) with $d_{kn}^{l+}$ coefficients ($\Pi^{l+} \Leftrightarrow \{d_{kn}^{l+}\}$). If the phase and conjugate operators are applied on the mother constellation, the interfering polynomial can be rewritten as $w(z)=\sum_{j=1}^{J} V_j \pi_j^{l+}(\odot \circledast : \phi_j \tau_j)z$. A typical resource interfering polynomial can be modeled as:

$$w_k(z) = \bigvee_{u=1}^{d_{k1}^{l+}} (\odot \circledast : \omega_{k1u})z + \bigvee_{u=1}^{d_{k2}^{l+}} (\odot \circledast : \omega_{k2u})z^2 + \ldots + \bigvee_{u=1}^{d_{kN}^{l+}} (\odot \circledast : \omega_{kNu})z^N,$$

$\forall k$, where $V_{u=1}^{d}(\odot \circledast : \omega_u)z^n = (\odot \circledast : \omega_1)z^n + \ldots + (\odot \circledast : \omega_d)z^n$ and $\omega := \phi\tau$ is a phase/conjugate operator parameter.

The physical interpretation of the above model is that $d_{kn}^{l+}$ out of $d_f$ interfering branches of resource node k come from dimension n of the mother constellation and each of those $d_{kn}$ branches are uniquely transformed corresponding to their phase/conjugate operator $\omega_{knu}$. As mentioned before, the permutation matrix set $\Pi^{l+}$ maximizes the power level variation of $p_k(z)$ in either n(·) or μ(·) senses. The phase/conjugate operators $\omega_{knu}$ do not change the power variation measures, i.e. $n(w_k(z))=n(p_k(z))$ or $\mu(w_k(z))=\mu(p_k(z))$. However, the branch operators help to increase the minimum Euclidian distance between the interfering dimensions. The distance between any two dimensional sets with any arbitrary operators is defined as: $D_{pair}^2((\delta_1)^{n_1}\mathcal{C}^+, (\delta_2)^{n_2}\mathcal{C}^+) := \min_{m_1,m_2 \in \{1, \ldots, M\}} |(\delta_1)c_{n_1 m_1} - (\delta_2)c_{n_2 m_2}|^2$, $\forall n_1, n_2 \in \{1, \ldots, N\}$. Therefore, for a given permutation set $\Pi^+ \Leftrightarrow \Rightarrow \{d_{kn}^+\}$, the phase/conjugate operators of every resource node k are optimized as follows:

$$\Omega_k^{l+} = \left\{ \{\omega_{k1u}^{l+}\}_{u=1}^{d_{k1}^{l+}}, \ldots, \{\omega_{kNu}^{l+}\}_{u=1}^{d_{kN}^{l+}} \right\} =$$

$$\arg\max_{\text{operators}} \min_{\substack{n_1, n_2 \in \{n|n=1,\ldots,N, \text{and } d_{kn}^{l+}>0\} \\ u_1 \in \{1,\ldots,d_{kn_1}^{l+}\} \\ u_2 \in \{1,\ldots,d_{kn_2}^{l+}\} \\ (u_1, n_1) \neq (u_2, n_2)}} D_{pair}^2((\odot \circledast : \omega_{kn_1 u_1})n_1 \mathcal{C}^+,$$

$$(\odot \circledast : \omega_{kn_2 u_2})n_2 \mathcal{C}^+)$$

The solution to the above problem is found with exhaustive search over all the possible operator combinations. $\Omega_k^{l+}$ representing the operator solution of resource node k for a given permutation candidate $\Pi^{l+}$. The optimal pair-wise minimum distance of $\Omega_k^{l+}$ is indicated by $d_{pair}^2(\Omega_k^{l+})$ The sparse structure of SCMA code helps to reduce the complexity of the above optimizations since the total number of operators is limited to $d_f$. The complexity analysis of the exhaustive search optimization is as follows: (i) Number of operators to be optimized: $d_f-1$. One operator can be null; (ii) Number of dimensional set pairs:

$$\binom{d_f}{2};$$

(iii) Number of distance calculations in $D_{pair}^2(\cdot,\cdot)$: $M^2$; (iv) Number of real add/mul. operations for a distance calculation: 7 adds +10 muls. If the cost of a real multiplication is $\alpha$ ($\geq 1$) times more than a real addition, the total cost of a distance calculation is $7+10\alpha$; (v) Number of options for a phase/conjugate operator: $2N_\phi$, where $N_\phi$ is number of grid points in the phase interval $[-\pi,\pi)$; (vi) Maximum number of interfering polynomials:

$$\binom{d_f + N - 1}{d_f}.$$

This the worst case scenario where the candidate permutation set $\{\Pi_1^+, \Pi_2^+, \ldots\}$ covers up all the possibilities of the interfering polynomials.

Based on the above parameters, the upper bound on the complexity cost C of the exhaustive search optimization is:

$$C < (d_f - 1)\binom{d_f}{2}M^2(7 + 10\alpha)2N_\phi\binom{d_f + N - 1}{d_f}.$$

By way of example, if M=4, N=2, $d_f$=3, $N_\phi$=360, and $\alpha$=2 $\Rightarrow$ C<7464960≅7.5e6 which can be computed in a short time in a typical 2 GHz processor. Note that these are all offline computations just for an SCMA coding optimization. At this point, the candidate permutation set $\{\Pi^{1+}, \Pi^{2+}, \ldots\}$ and their corresponding operators and optimal distances, which are given as $\{\{\Omega_k^{1+}\}_{k=1}^K, \{\Omega_k^{2+}\}_{k=1}^K, \ldots\}$ and $\{\{d_{pair}^2(\Omega_k^{1+})\}_{k=1}^K, \{d_{pair}^2(\Omega_k^{2+})\}_{k=1}^K, \ldots\}$ (respectively), are available.

The best permutation set can be easily selected based on the following criterion: $\Pi^+, \{\Omega_k^+\}_{k=1}^K$=arg max$_{\Pi^{l+}\in\{\Pi^{1+},\Pi^{2+},\ldots\}}$ min$_k$ $d_{pair}^2(\Omega_k^{l+})$, and if there is more than one solution of $(\Pi^+,\{\Omega_k^+\}_{k=1}^K)$ for the above problem, among those, the one is selected which has the maximum total minimum distance, i.e. $\Sigma_{k=1}^K d_{pair}^2(\Omega_k^+)$ is the largest.

As an alternative to the pair-wise operator optimization criterion mentioned above, a superposition criterion is introduced for operator optimization, as well. The superposition criterion is defined as below:

$$\Omega_k^{l+} = \{\{\omega_{k1u}^{l+}\}_{u=1}^{d_{k1}^{l+}}, \ldots, \{\omega_{kNu}^{l+}\}_{u=1}^{d_{kN}^{l+}}\} =$$

$$\text{argmax}_{operators} d_{min}^2\big((\odot\circledast : \omega_{k11})^1 \mathcal{C}^+ + \ldots + (\odot\circledast : \omega_{k1d_{k1}^{l+}})^1 \mathcal{C}^+ +$$

$$\ldots + (:\omega_{kN1})^N \mathcal{C}^+ + \ldots + (\odot\circledast : \omega_{kNd_{kN}^{l+}})^N \mathcal{C}^+\big),$$

in which for any two sets $\mathcal{A}$ and $\mathcal{B}$, we define $\mathcal{A} + \mathcal{B} := \{c | c = a'b, \forall a \in \mathcal{A} \text{ and } \forall b \in \mathcal{B}\}$. The superposition and pair-wise criteria are compared below.

Figure 11:
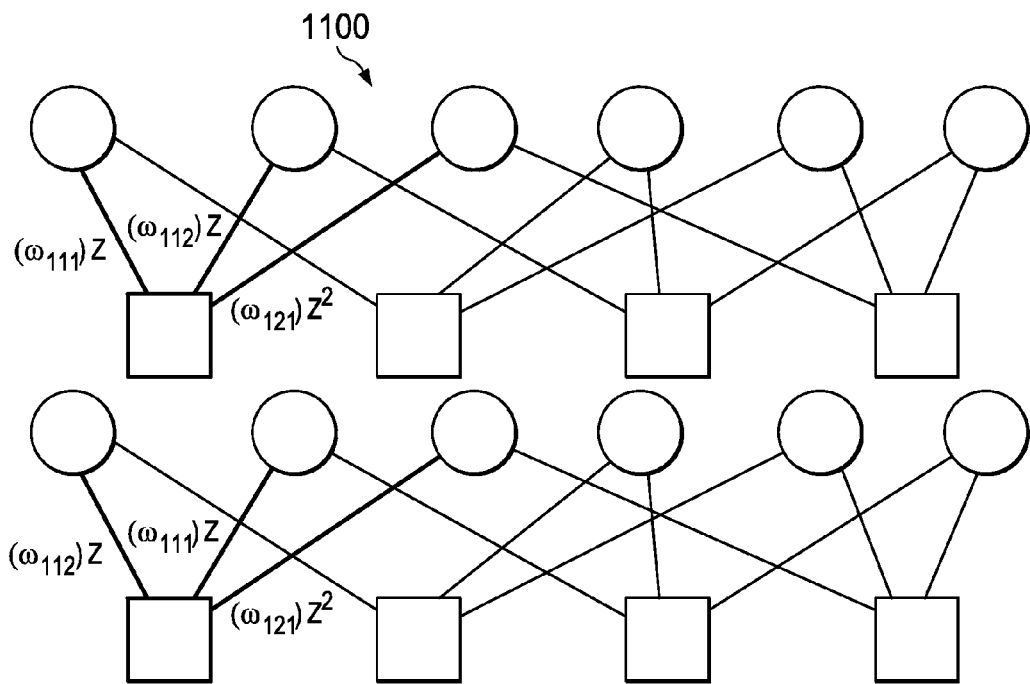
FIG. 11 illustrates a diagram of another factor graph representation of an SCMA code.

After optimizing the operators and determining the optimal w(z), the immediate question is how to allocate the optimal operators to the different interfering layers. As a simple example, the corresponding operators of interfering polynomial $p_1(z)=2z+z^2$ is $w_1(z)=(\omega_{111}\vee\omega_{112})z+w_{121}z^2$. According to $p_1(z)$, two interfering layers are from the first dimension. FIG. 11 illustrates a factor graph 1100, $\omega_{111}$ and $\omega_{112}$ can be allocated to either of the interfering layers. Here the total number of the allocation options is 2.

As a general rule, for an interfering polynomial of form $w_k(z) = V_{u=1}^{d_{k1}}(\odot\circledast): \omega_{k1u})z + V_{u=1}^{d_{k2}}(\odot\circledast): \omega_{k2u})z^2 + \ldots + V_{u=1}^{d_{kN}}(\odot\circledast): \omega_{kNu})z^N$, $\forall k$. Notably, the operators can be allocated to an SCMA code in $\Pi_{k=1}^K \Pi_{n=1}^N d_{kn}!$ different ways. As shown later, the impact of the operator allocation on the performance of the final SCMA code is negligible. The reason is that regardless of what operators are allocated to what interfering layers, the combined interference at a given recourse node does not change. Based on this observation, the optimized operators can be randomly (or in a given order) allocated to the interfering layers of each resource node to construct the final SCMA code.

In some instances, LDS as a special case of SCMA. An LDS modulator is defined by its signature matrix $S=[s_j]_{j=1}^J$ and input QAM constellation points q: $\mathbb{B}^{log_2 M} \to Q \subset \mathbb{C}$ where q=q(b). The whole LDS modulator is represented by $\mathcal{L}([j]_{j=1}^J, q; J, M, N, K)$ in which K is the length and N is the number of non-zero elements of every signature. An LDS modulator can be redefined based on the SCMA structure, in accordance with $\mathcal{L}([s_j]_{j=1}^J, q; J, M, N, K) = \mathcal{S}([V_j]_{j=1}^J, [g_j]_{j=1}^J; J, M, N, K)$, in which $g_j \equiv \Delta_j g$, $g \equiv q1_N$, $1_N$ is an all-one vector of size N, $\Delta_j = \odot$: phase $(s_j^{[\circ]})$, phase$(ae^{j\theta})=\theta$ for any non-negative $a \in \mathbb{R}$ and $\theta \in [-\pi,\pi)$, $s_j^{[\circ]}$ is a N-dimensional complex vector of the non-zero elements of $s_j$, $[V_j]_{j=1}^J$ is built up on the factor graph matrix F, and $(F)_{kj}=1$ if and only if $(S)_{kj}\neq 0$. Therefore, an LDS modulator is a special SCMA code with a simple multi-dimensional mother constellation constructed by the repetition of QAM constellation points and hence $^n\mathcal{C}=Q$, $\forall n=1,\ldots,N$. In addition, a constellation operator is limited to a phase rotation without any conjugate or permutation operations. The permutation has no impact when all the dimensions of the mother constellation are identical. Following an SCMA code design procedure, the pair-wise optimization of LDS signatures for a given mapping matrix set $[V_j]_{j=1}^J$ is formulated as follows: $\{\phi_u^+\}_{u=1}^{d_f}=$arg max$_{phases}$ min$_{1 \leq u_1 < u_2 \leq d_f} D_{pair}^2((\odot: \phi_{u_1})Q, (\odot: \phi_{u_2})Q)$, in which one operator is set to null, for example $\phi_1^+=0$. Also, the superposition criterion for LDS signature optimization is expressed as: $\{\phi_u^+\}_{u=1}^{d_f}=$arg max$_{phases}$ $d_{min}^2((\odot: \phi_1)Q+(\odot: \phi_2)Q+\ldots+(\odot:\phi_{d_f})Q)$.

Similar to SCMA code, the operators of a resource node can be allocated to the interfering layers in $d_f!$ different ways. The phase operators of the SCMA code are equivalent to the phase rotations of the signatures of the LDS modulator. For the case that Q is a M-PSK constellation, the solution to the above pair-wise optimization problem is straightforward:

$$\varphi_u^+ - (u-1)\frac{2*\pi}{Md_f} + e_u\frac{2\pi}{M},$$

Figure 12:
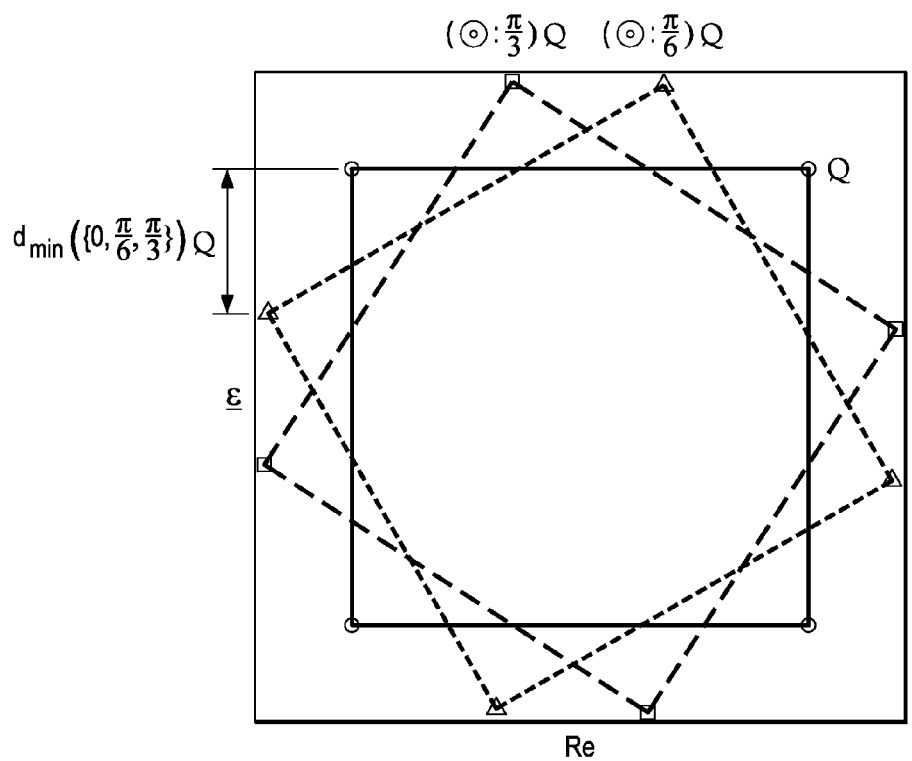
FIG. 12 illustrates a diagram of a graph of phase rotations.

∀u=1, ..., $d_f$, where $e_u$ is any arbitrary member of $\mathbb{Z}$. FIG. 12 illustrates a graph showing an example optimal phase rotations, in which N=2, M=4, and $d_f$=3 the optimal phase rotations are $$\{0, \frac{\pi}{6}, \frac{\pi}{3}\}.$$

Every resource node has 3!=6 options to allocate phases to the interfering layers. The total number of the options for the whole signature set with 4 resource nodes is $6^4$=1296.

An LDS system can be molded as y=diag(h)Su+n. Note that for adjacent resources h is almost constant. We replace u=$S^\dagger$x+z where $S^\dagger$ is the pseudo inverse of the signature matrix S and x to represent the core signal transmitted over the resources which results in the lowest post processing power for z which is diag($Szz^H S^H$). By selecting x=Su, the projection of the post processing noise power over the dimensions of S associated with z is diag($Szz^H S^H$)=0. The final SNR for the core signal is a function of the original SNR and the power of u which is constant given the constraint of designing the signature matrix. However, the post processing power of each layer is a function of the power of z which is given by $N_1$=diag (E{$zz^H$})=diag(($I-S^\dagger S$)$^2$), assuming that the total power of the transmit signal is normalized. One can notice that trace{ ($I-S^\dagger S$)} is constant, therefore, in order to minimize the total transformation noise and using the Cauchy-Schwarz inequality, all the values in the vector $N_1$ are the same. Moreover, different layers differ by diag($S^\dagger S^{\dagger H}$). In other words, not considering the non-linear effect of MPA, the final SNR for all layers is given by:

$$\gamma = \frac{\text{diag}(S^\dagger S^{\dagger H})}{N_1 + N_0}.$$

In the above, $N_0$ is the effective post processing noise and division is performed element by element. One should note that all the above calculations are for insight only and the non-linearity of MPA will affect the accuracy of the calculation. As the MPA tries to decode the layers, it is actually trying to reduce the impact of the transformation noise $N_1$ on the core transmit signal. In order for MPA to converge better, one should try to make the signal powers and noise powers of all the layers to be close to each other but not the same. Very different values result in very different performance for different layers and very close values results in difficulty for MPA to converge properly. After convergence of the MPA algorithm, the dominant factor in differentiating the performance of different layers is their powers measured by diag ($S^\dagger S^{\dagger H}$). The above calculations show three factors: (1) The core noise enhancement caused by the signature should be reduced in order to improve the performance of all layers; (2) The performance of individual layers is affected by the effective post-processing power denoted by diag($S^\dagger S^{\dagger H}$); and (3) The overall throughput of the code is obtained when the values of the transformation noise vector are close to each other (but not very close) and the effective power per layer is also the same. One can apply different FEC code rates to different layers based on their effective signal power to maximize total throughput.

With respect to SCMA Performance, performance of an SCMA code can be evaluated through a link-level simulation. However, as an alternative approach, EXIT chart technique is adopted for the SCMA code evaluation, as well. EXIT chart is also used to confirm the validity of the proposed design methodology for SCMA codes. EXIT chart is used as a designing tool and relative performance prediction of SCMA codes.

Regarding EXIT Chart Evaluation Methodology. Belief propagation algorithms rely on convergence of wisdom among different nodes where optimal decoder is practically impossible. LDPC, turbo codes, LDS and SCMA are examples of systems, where belief propagation is the only viable solution for decoding. Those systems are described by multiple nodes from same or different types that exchange information and at each iteration try to utilize the underlying code properties. For example, turbo code is modeled by two component codes which exchange a large set of information. Information is interleaved/de-interleaved to maintain some level of independency among adjacent positions. For LDPC, the code is described by a bipartite graph, where check nodes and variable nodes exchange information and the graph is designed such that short loops are rare/nonexistent to maintain information independence among edges connected to the same node.

EXIT chart is a very interesting and powerful tool to design and predict the performance of such codes. For a very long code and with information independence at each node, one can model each component as a function in which it combines the information given by the other nodes with its intrinsic information and returns the information back to those nodes. Each node can be described by a transfer function, where the average extrinsic output information is a function of its average extrinsic input information. The exit chart then predicts whether the decoder is likely to converge after reasonable number of iterations between the two nodes. By depicting the transfer function of one node and the mirrored transfer function of the other node with respect to Y=X line, the code is likely to converge if the two transfer functions do not collide. Moreover, the wider the gap between the two curves for its entirety, the faster and likelier the convergence of the decoder.

SCMA is an example of such codes which can be represented by a bipartite graph where layer nodes exchange information with resource nodes. For this code, we study its EXIT chart to predict the performance and study the designing criteria. Unfortunately, since the code graph is very small compared to its LDPC counterparts, EXIT chart is not very accurate in predicting the convergence as (i) the information is not totally independent due to short loop sizes, and (ii) the code length is small and the law of the big numbers does not apply. However, studying the EXIT chart for these codes can lead us on comparing different designs as well as some tool for designing such codes.

Regarding EXIT chart for SCMA. SCMA consists of two component nodes, layer node and resource nodes. At each layer node, the carried information represents the same constellation node and in each resource node, the constellation points associated with multiple layers are interfering with each other. A resource node utilizes its intrinsic information which is the received complex signal with its extrinsic information on other layers to estimate the output extrinsic information on each of the layers. In a layer node, the intrinsic information which is the a priori information about the layers set by the encoder or from outer loop decoder is combined with the extrinsic information to determine the information about the layer as well as the extrinsic information back to the resource nodes. In the Appendix, how to model the input and output information is described. Such modeling is not unique and a wise selection should mimic the dynamics of the information exchange in the code. Each link in SCMA can carry up to the maximum information in the constellation, which in our study is set to two bits. One may notice that unlike LDPC and turbo codes where the role of the code is to make sure all the information bits converge, SCMA is neither required nor able to do so. The reason is at each resource node, even if there is full 2-bit extrinsic information for all other edges, noise still exists and results in less than perfect extrinsic information at the output of the resource nodes. However, this is not an issue since SCMA decoder is follows by FEC decoder(s) and it requires input information that is slightly higher than its code rate. For example with a code rate of ½, one requires only 1 bit per layer node information at the output to satisfy FEC decoder.

To achieve this, three components may be used: (i) modeling the EXIT transfer at a layer node, (ii) the EXIT transfer at a resource node, and (iii) the output information at each layer. Here, an algorithm is provided to generate the aforementioned information and predict the performance of the code.

The following relates to Generating an EXIT chart for SCMA. While maintaining the generality of the algorithm, we use the example of SCMA with four resources and six layers, where each layer is connected to two resource nodes and each resource node is the superposition of four layers. We assume that the number of points in the constellation is four which means up to two bits of information is carried per edge. We use SISO AWGN channel for generating EXIT chart for resource nodes. For a given SCMA with a given factor graph, constellation set and operator set, the procedure to produce the EXIT chart for resource nodes is as follows: (1) Set the resource node noise level ($N_0$) according to the working SNR value. This value is affected by the code rate of the FEC; (2) At each of the resource nodes (4 in this particular example), set the power level for each edge in the factor graph, based on the power setting of the layer node linked to that resource node. The details of how to set the power levels are explained in the appendix; (3) Set an auxiliary noise level range ($N_1$) to model different levels of input extrinsic information. When $N_1$ is very large, no extrinsic information is available. Very small auxiliary noise levels mean perfect extrinsic information (2-bits in the example) is available at the input of the edge. Quantize the range of the auxiliary noise level into a vector. Continue the procedure with the first entry in the vector; (4) For each layer, select one of the constellation set according to the constellation probability (¼ for each of the 4-point in the constellation in this example); (5) For each resource node, generate the received Gaussian noise based on the channel noise level $N_0$; (6) For each edge at each resource node, using the power settings of step 2 and the selected auxiliary noise level $N_1$, generate a 4-tuple set of probabilities as explained in the appendix; (7) Find the average input extrinsic information for all edges at the factor graph, then store it as X; (8) Perform the 4-touple output extrinsic probability for each of the edges in the factor graph. In this example, 12 output extrinsic information values are generated; (9) Find the output extrinsic information given by each of the 4-tuple probabilities, then store it as $Y_1$ to $Y_L$. $L=Kd_f$ is the number of edges in the factor graph (12 in the example); (10) Repeat steps 4 to 9 for many times (1000 as an example); (11) Average the input information (X) and the output information (Y) over all repetitions. Store it into $\overline{X}$ and $\overline{Y}_1$ to $\overline{Y}_L$; (12) For each of the variable nodes, combine the output extrinsic information (as explained in the appendix) to find the output extrinsic information $Z_1$ to $Z_1$, where J is the number of layers; (13) Repeat steps 4 to 12 for all the values of the auxiliary noise vector.

The values of Y with respect to X represent how a resource node can utilize the extrinsic information. A higher curve predicts a faster and more reliable convergence of the information. Z values predict how different layers behave when the MPA algorithm converges.

The following procedure can be used to estimate the transfer functions for layer nodes. In the easy example of layer nodes with two nodes and no a priori information, the transfer function is just Y=X line: (1) At each of the layer nodes (6 in this example), set the power level for each edge in the factor graph, based on the power setting of the layer node linked to that resource node. The details of how to set the power levels are explained in the appendix; (2) Set an auxiliary noise level range ($N_1$) to model different levels of input extrinsic information. When $N_1$ is very large, no extrinsic information is available. Very small auxiliary noise levels mean perfect extrinsic information (2-bits in the example) is available at the input of the edge. Quantize the range of the auxiliary noise level into a vector. Continue the procedure with the first entry in the vector; (3) For each layer, select one of the constellation set according to the constellation probability (¼ for each of the 4-point in the constellation in this example); (4) For each edge at each layer node, using the power settings of step 2 and the selected auxiliary noise level $N_1$, generate a 4-tuple set of probabilities as explained in the appendix; (5) Find the average input extrinsic information for all edges at the factor graph and then store it as X; (6) Perform the 4-touple output extrinsic probability for each of the edges in the factor graph. In this example, 12 output extrinsic information values are generated; (7) Find the output extrinsic information given by each of the 4-tuple probabilities, then store it as $Y_1$ to $Y_L$. $L=Kd_f$ is the total number of edges in the factor graph (12 in the example); (8) Repeat steps 3 to 7 for many times (1000 as an example); (9) Average the input information (X) and the output information (Y) over all repetitions. Store it into $\overline{X}$ and $\overline{Y}_1$ to $\overline{Y}_L$; (10) Repeat steps 3 to 9 for all the values of the auxiliary noise vector.

The values of Y with respect to X represent how a layer node exchanges the information among the edges in the same layer node. A higher curve predicts a faster and more reliable convergence of the information. Since the input extrinsic information for a layer node is the output of a resource node and vice versa, usually, the EXIT chart for these nodes is mirrored along the Y=X line.

Regarding EXIT chart evaluation and performance prediction. The following description relates to the EXIT chart evaluation methodology, and in some instances to EXIT chart evaluation methodology for a simple code with an example factor graph. In the following, the channel is assumed to be a SISO AWGN with SNR of 8 dB.

Regarding EXIT chart for LDS. In LDS, the constellation points are simply taken from the QPSK points and the signatures are as following:

$$S_1 = \begin{bmatrix} 0 & 1 & -1 & 0 & i & 0 \\ 1 & 0 & i & 0 & 0 & -1 \\ 0 & -1 & 0 & i & 0 & 1 \\ i & 0 & 0 & -1 & 1 & 0 \end{bmatrix}.$$

Figure 13:
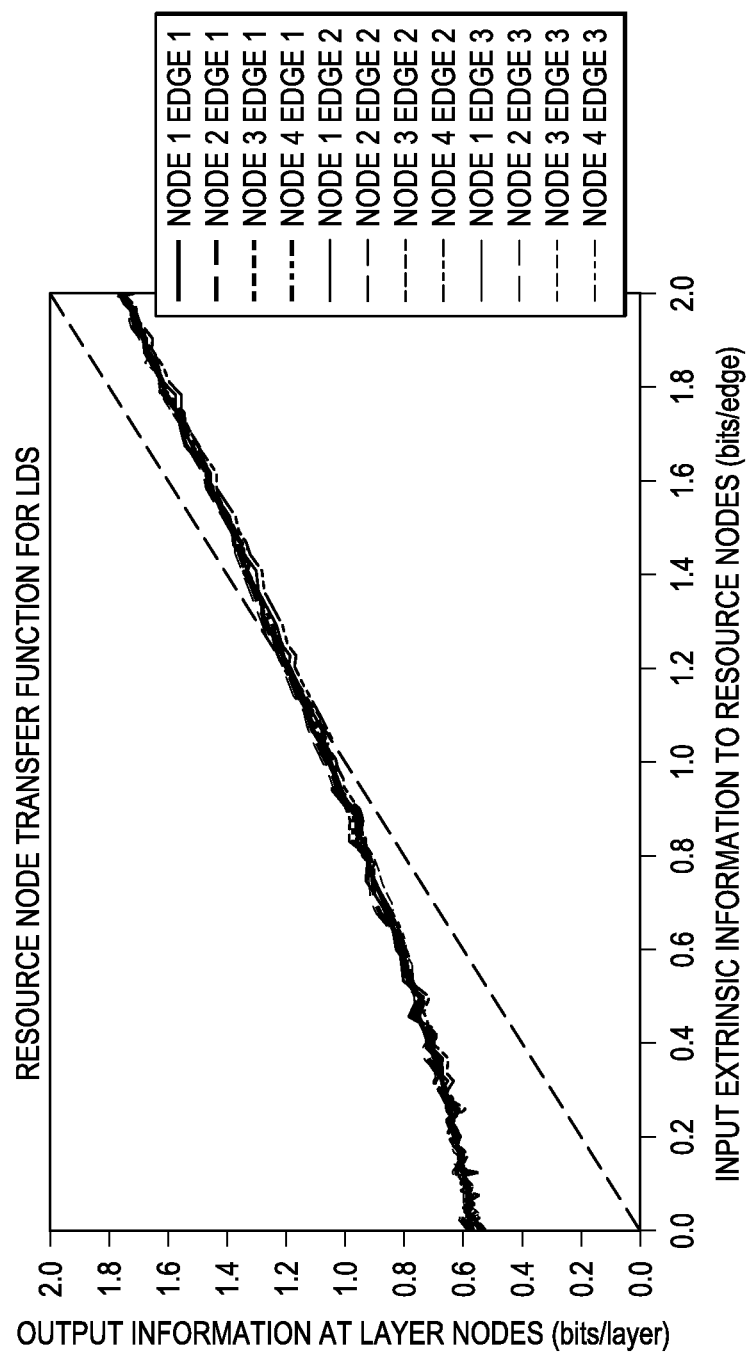
FIG. 13 illustrates a chart depicting an extrinsic information transfer function for resource and layer nodes in LDS.
Figure 14:
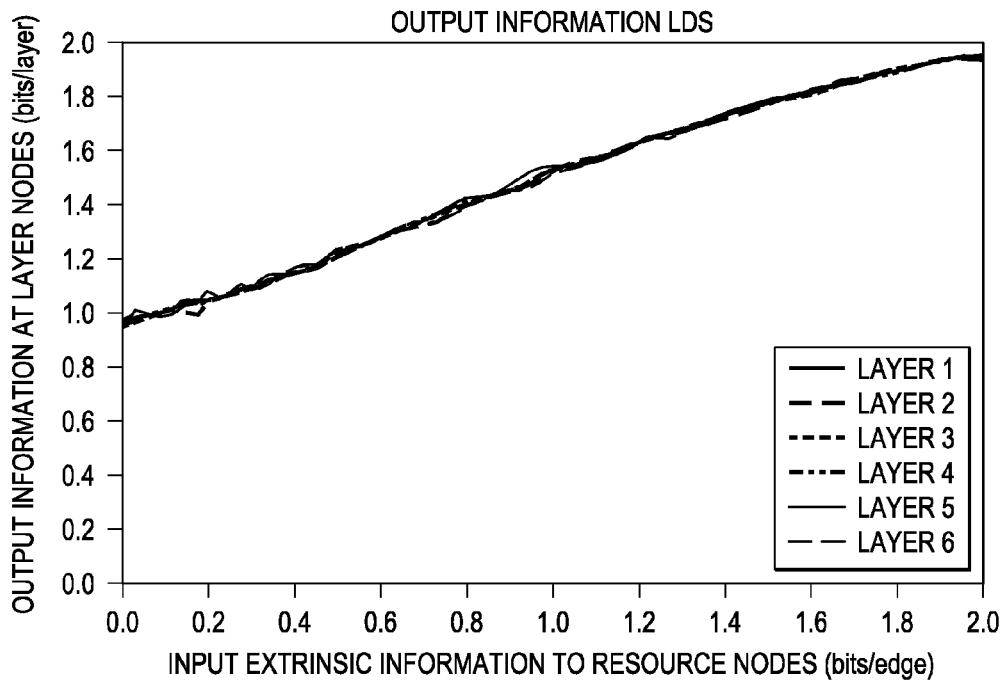
FIG. 14 illustrates a chart depicting output layer information vs. input extrinsic information to resource nodes of LDS.

For code signature 1, the extrinsic transfer functions for the resource nodes of LDS are shown in the following curves. As can be seen in the FIG. 13, the output information at all nodes are the same. This is not surprising as all the edges in LDS experience the same constellation and power level. As mentioned before, the transfer function for a layer node with two edges is just exchanging the information (i.e. Y=X line). This curve collides with Y=X line at about 1.2 bits suggesting that with very large LDS, the code will converge to about 1.2 bits of information per edge. The convergence of the information is shown by the arrows in the EXIT chart as the information is exchanged between function and layer nodes. One should note that such assumption does not hold for a code consisting of only 4 resources and 6 layers. FIG. 14 shows the output information for the same extrinsic information.

FIG. 14 shows the output information at the output of the layer nodes. For a very large LDS, the extrinsic information at the edges would rise up to 1.2 bits, which suggest that the information at the output would be as high as 1.6 bits for the SNR of 8 dB and therefore a code rate of less than 0.8 should suffice for decoding. Note that in the SNR of 8 dB the capacity for each link is 1.9132 bits which is only 20% higher than the predicted rate by the EXIT chart. Again, such assumption does not hold here.

For LDS with signature 2 as follows:

$$S_2 = \begin{bmatrix} 0 & 1 & e^{\frac{j\pi}{3}} & 0 & e^{\frac{j2\pi}{3}} & 0 \\ e^{\frac{j\pi}{3}} & 0 & 1 & 0 & 0 & e^{\frac{j2\pi}{3}} \\ 0 & e^{\frac{j2\pi}{3}} & 0 & e^{\frac{j\pi}{3}} & 0 & 1 \\ e^{\frac{j2\pi}{3}} & 0 & 0 & 1 & e^{\frac{j\pi}{3}} & 0 \end{bmatrix}$$

Figure 15:
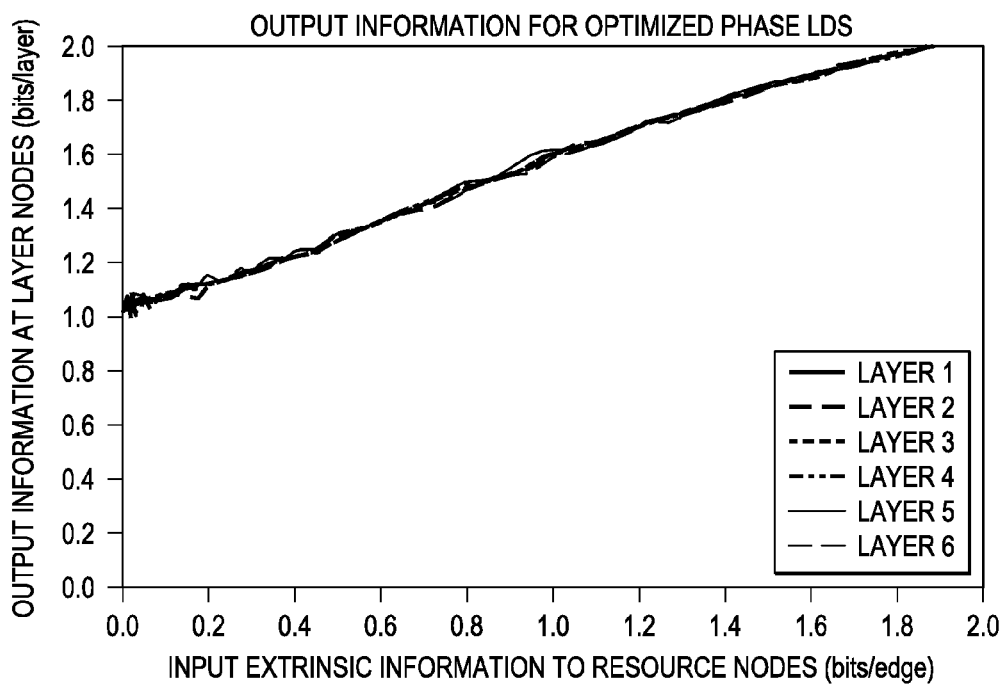
FIG. 15 illustrates a chart depicting extrinsic information transfer functions for LDS with signature $S_2$.
Figure 16:
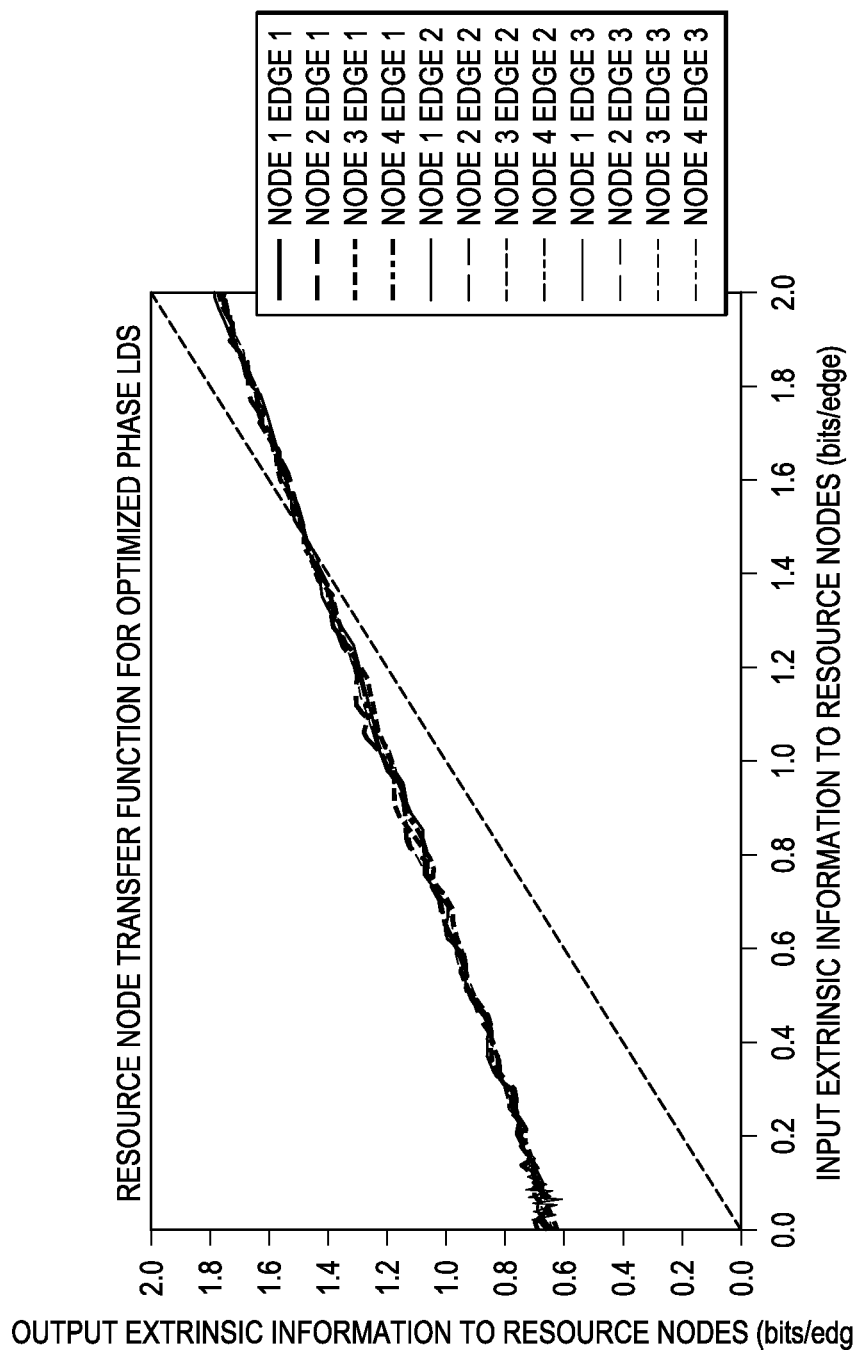
FIG. 16 illustrates a chart depicting output information for LDS signature $S_2$.

The curves in FIGS. 15-16 express the EXIT charts. We can note that the EXIT chart predicts the extrinsic information to grow to around 1.5 bits per edge and the output information to around 1.8 bits, which is 6% away from capacity. As mentioned before, the assumptions of large code and independent streams do not hold here.

With respect to an EXIT chart for SCMA. There are many parameters affecting the performance of SCMA. Those include the complex constellation selection, effect of phase optimization, selecting the right permutation, assigning different resource nodes to layer nodes, etc. In the following we study the effect of those elements.

With regards to the effect of phase and conjugate operators. The following uses the optimized multi-dimensional constellation to evaluate the EXIT chart. For each resource node with three edges, four options are possible: (i) all three edges are selected from the first row in the constellation matrix, (ii) two edges from the first row and one from the second one, (iii) two from the second row and one from the first one, and (iv) all three edges are from the second row. Here we represent these resource nodes by types $T_1, \ldots, T_4$.

Figure 17:
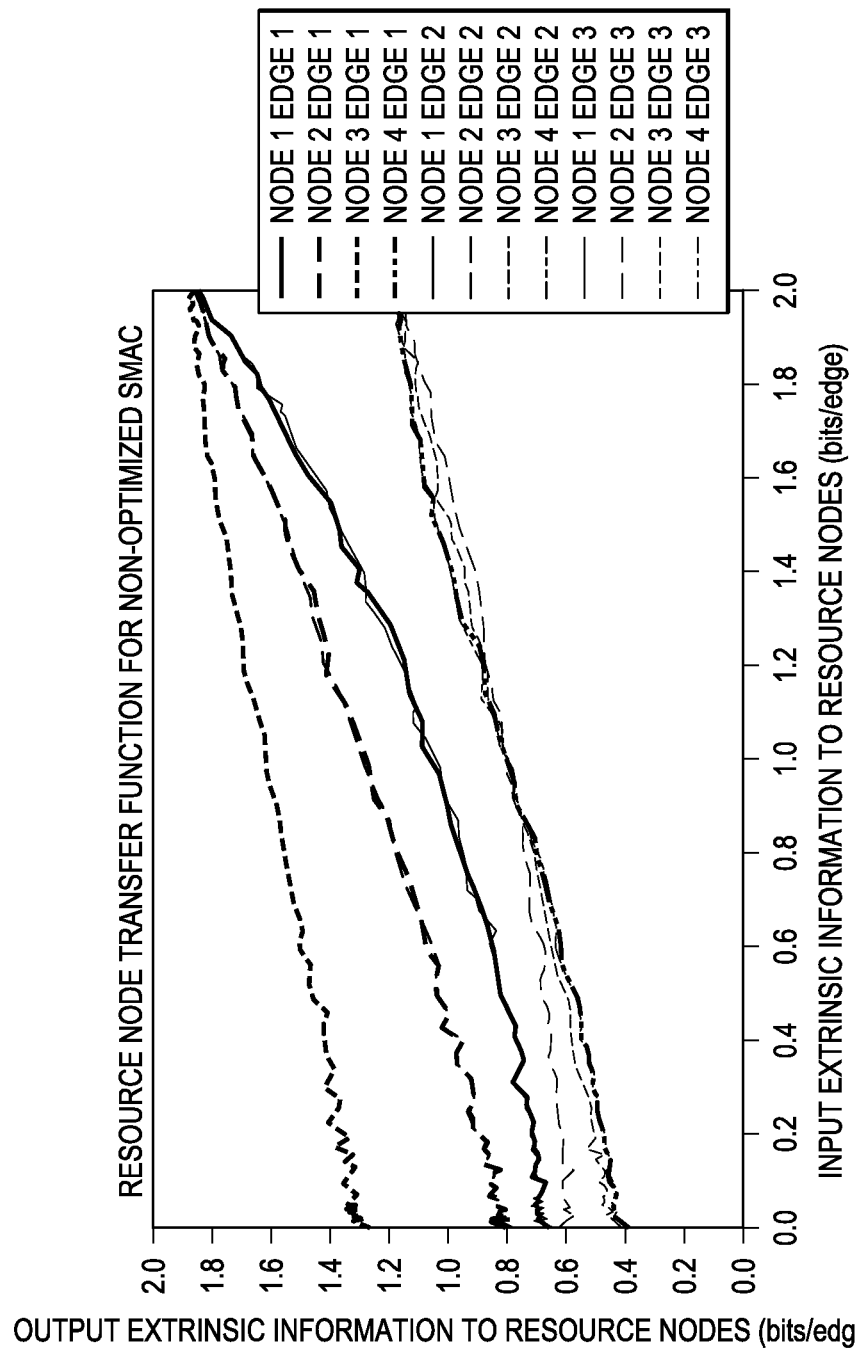
FIG. 17 illustrates a chart depicting extrinsic information transfer function for four resource nodes of an SCMA code without phase/conjugate optimization.
Figure 18:
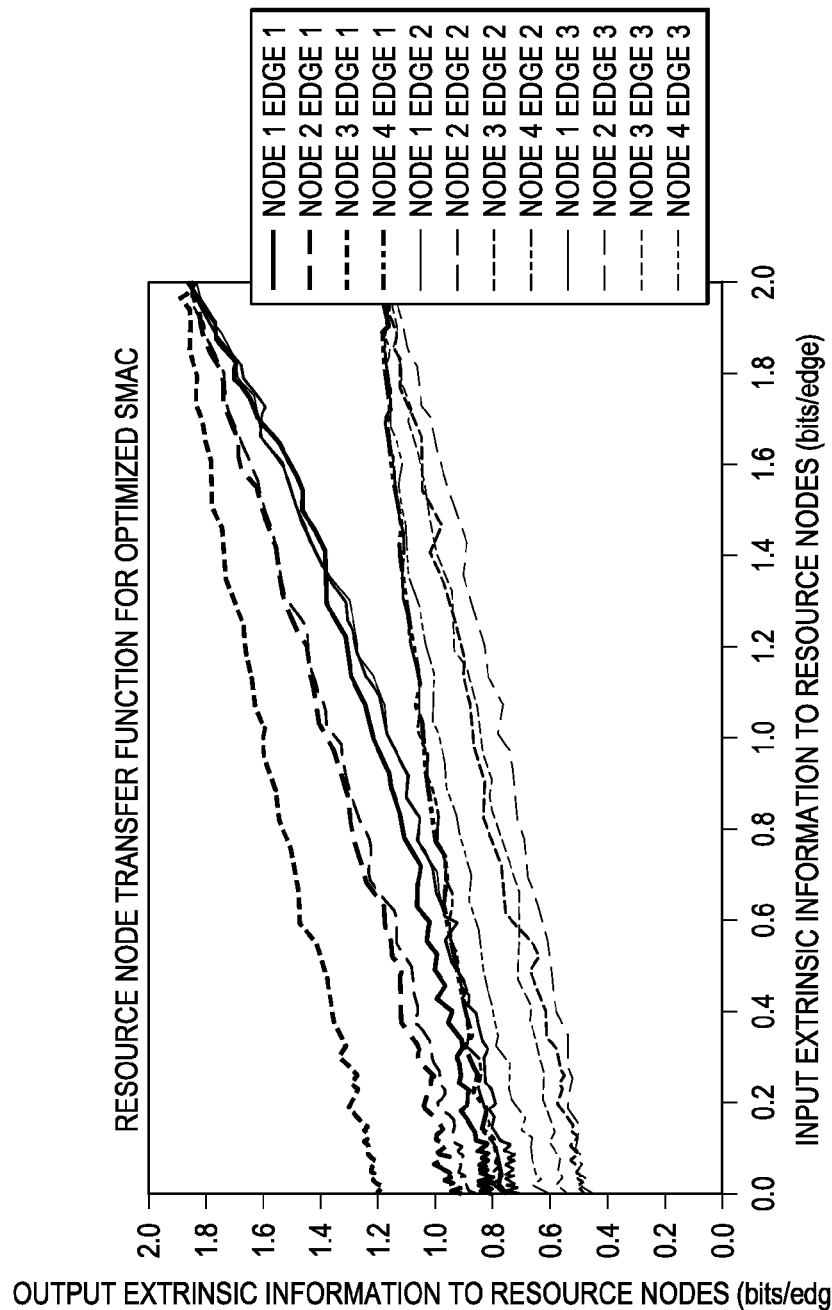
FIG. 18 illustrates a chart depicting extrinsic information transfer function for four resource nodes of an SCMA code with phase/conjugate optimization.

The extrinsic information transfer function for these four types of resource nodes without or with phase/conjugate optimizations are shown in FIG. 17 and FIG. 18, respectively.

From these figures, the following conclusions can be drawn: (1) The output extrinsic information at the output of resource nodes is higher when the phase/conjugate operators are optimized. This is even more observable when there is little extrinsic information available for the other layers (i.e. the left part of the curves); (2) This results in a better convergence of the MPA algorithm with optimized phase and conjugate; (3) For nodes that all the constellation points are from the same row (i.e. types $T_1$ and $T_4$, the difference are higher; (4) The output extrinsic information for edges using the first row of constellations is higher than the other ones. This is due to the fact that more power is transmitted over those links; (5) At the right hand of the curves, where there is perfect information about the interference at the resource node, all that matters is the power assigned to that link.

Regarding link-level evaluation. The link-level simulation results are shown to justify the proposed design methodology for SCMA and LDS. In addition, the performance of the designed SCMA and LDS codes are compared with the best LDS signatures already exist. Throughout the whole simulation results presented below, the basic parameters as set as following: N=2, K=4, J=6, $d_f$=3.

Figure 19A:
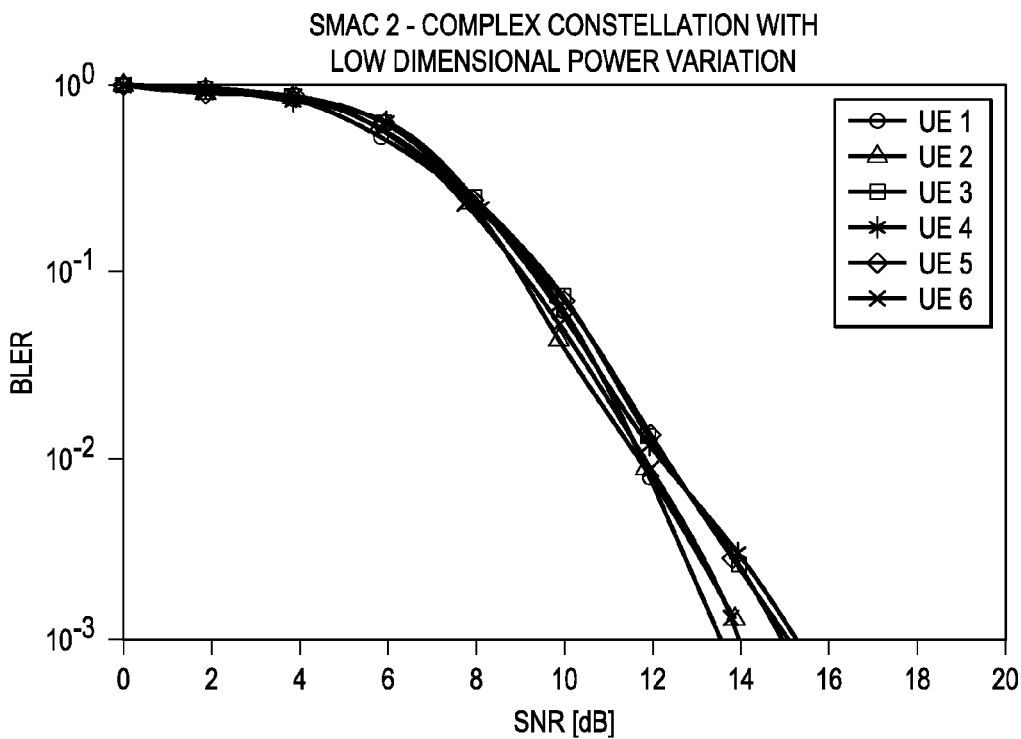
FIG. 19(a) illustrates a chart depicting an impact of dimensional power variation of multi-dimensional constellation on the performance of an SCMA code.
Figure 19B:
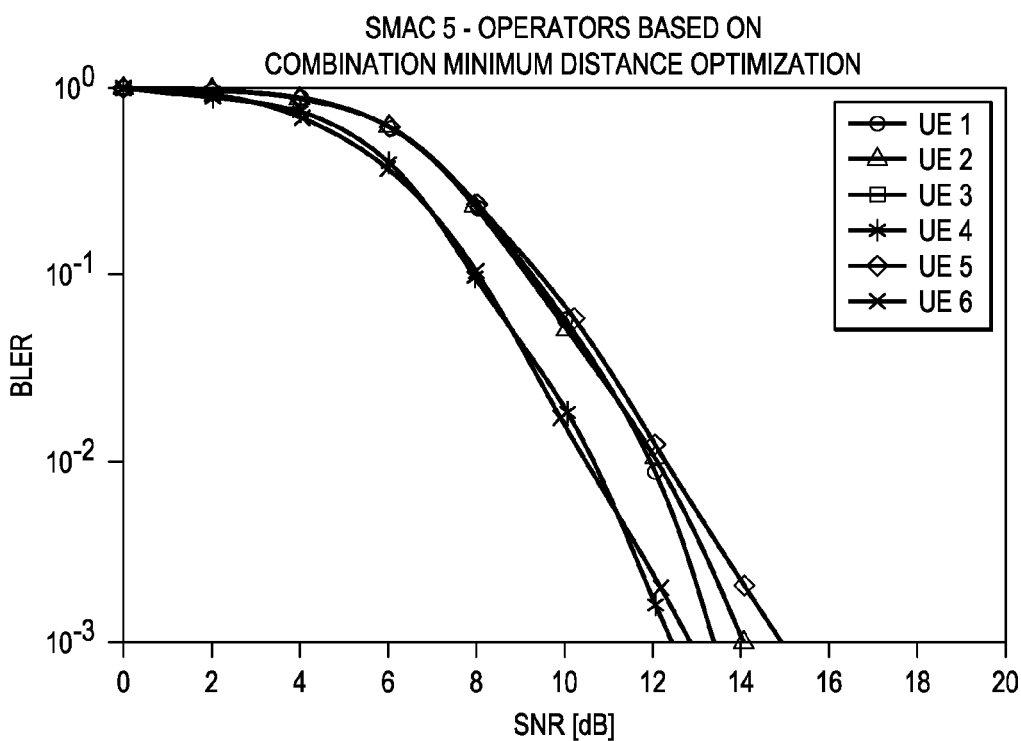
FIG. 19(b) illustrates a chart depicting an impact of dimensional power variation of multi-dimensional constellation on the performance of another SCMA code.

Regarding the effect of constellation for SCMA. For a given real domain multidimensional constellation, the impact of the dimension power variation of the complex domain constellation is shown in FIGS. 19a-b. As shown in FIGS. 19a-b, a higher power variation improves the overall performance.

Figure 20A:
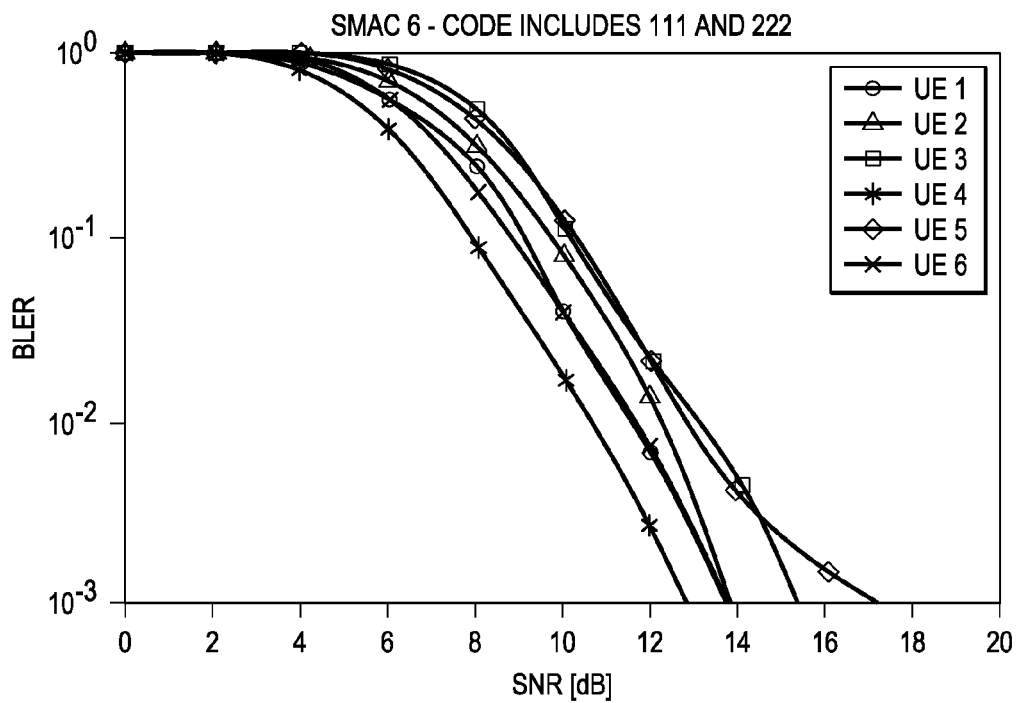
FIG. 20(a) illustrates a chart depicting impact of permutation operator on the performance of an SCMA code.
Figure 20B:
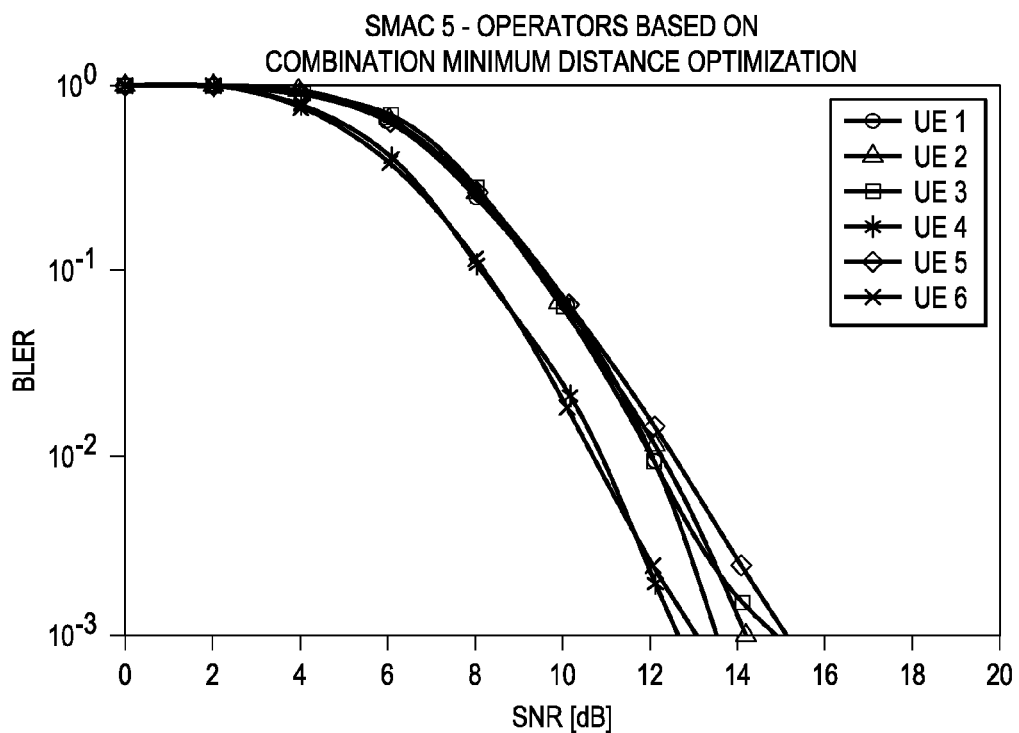
FIG. 20(b) illustrates a chart depicting impact of permutation operator on the performance of another SCMA code.

Regarding the effect of permutation operator on SCMA. The impact of the permutation operator on the performance of an SCMA code is presented in FIG. 20. These results confirm that the interfering polynomials should have as many as possible number of monomials to take advantage of the dimensional power variation of the mother constellation by increasing the near-far effect at the resource nodes.

Figure 21A:
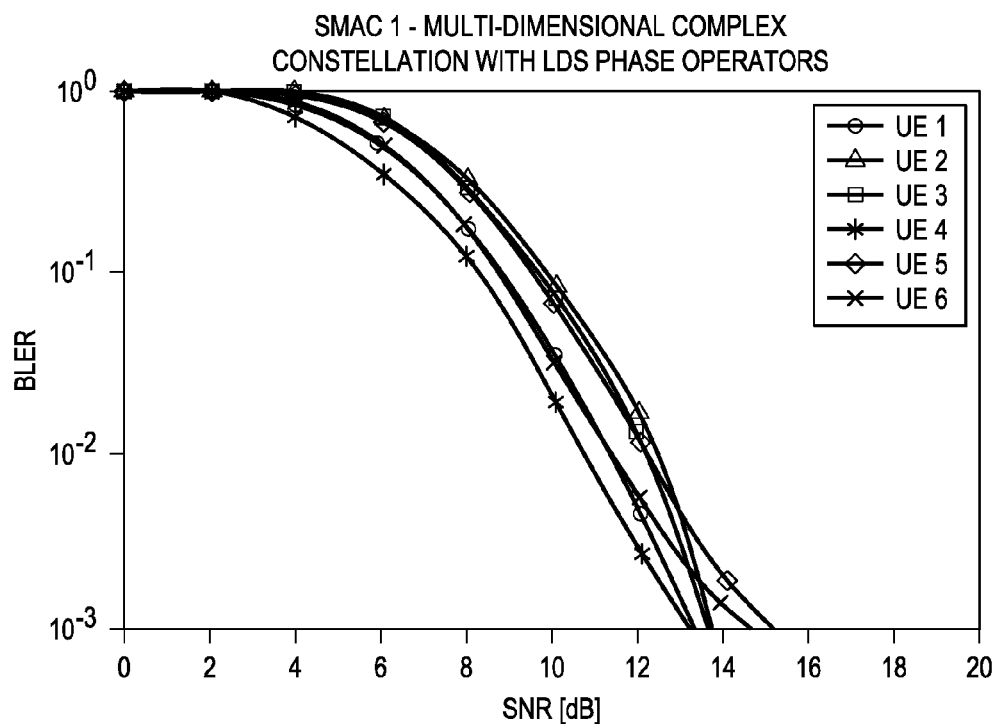
FIG. 21(a) illustrates a chart depicting impact of phase/conjugate operators on the performance of an SCMA code.
Figure 21B:
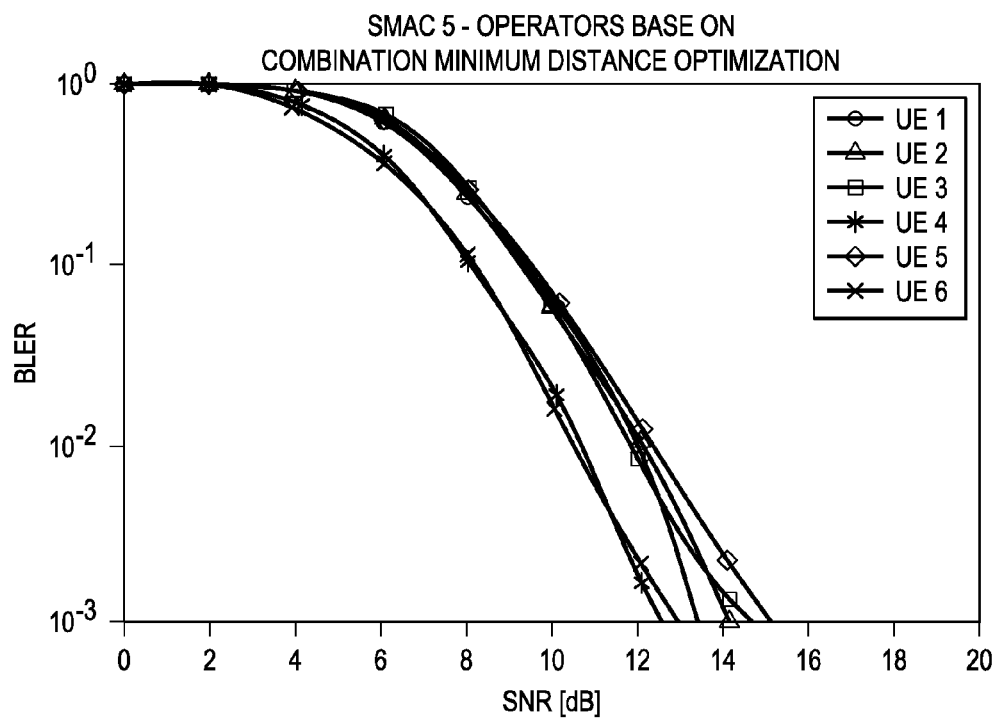
FIG. 21(b) illustrates a chart depicting impact of phase/conjugate operators on the performance of another SCMA code.

Regarding the effect of phase/conjugate operators for SCMA. FIG. 21 illustrates the impact of phase/conjugate operators on the performance of an SCMA code. In general, the impact of operator optimization is positive, but for this particular case the gain is not very high.

Figure 22A:
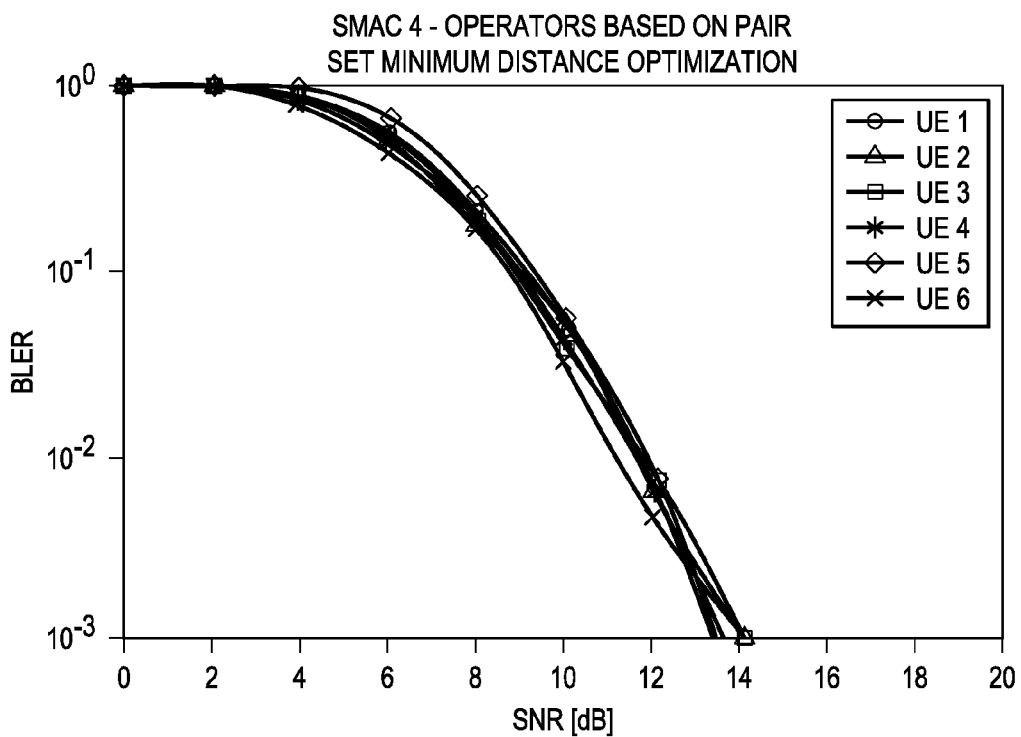
FIG. 22(a) illustrates a chart depicting comparison of two different optimization criterion for the phase/conjugate operators of an SCMA code.
Figure 22B:
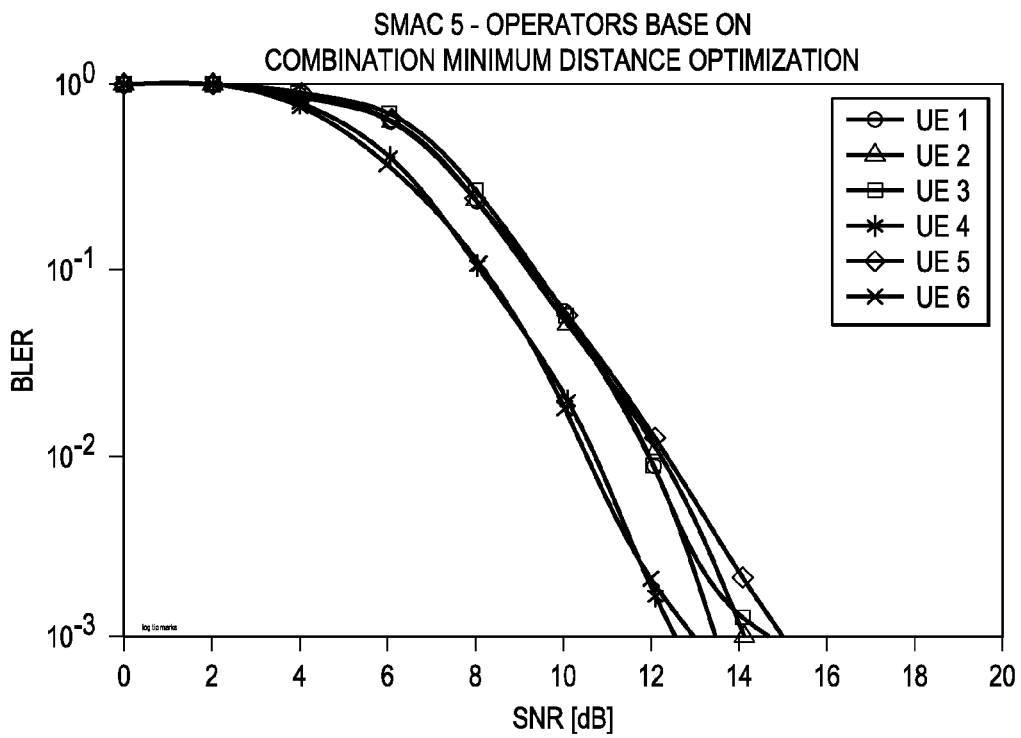
FIG. 22(b) illustrates a chart depicting comparison of two different optimization criterion for the phase/conjugate operators of another SCMA code.

As explained before there are two approached to optimize the phase/conjugate operators: (i) pair-wise optimization, and (ii) superposition optimization. FIG. 22 compares these two criteria. According to this figure, two approaches might tend to different behavior of the designed codes. The code which is designed based on the pair-wise criterion shows more uniform performance across the different multiplexed users.

Figure 23:
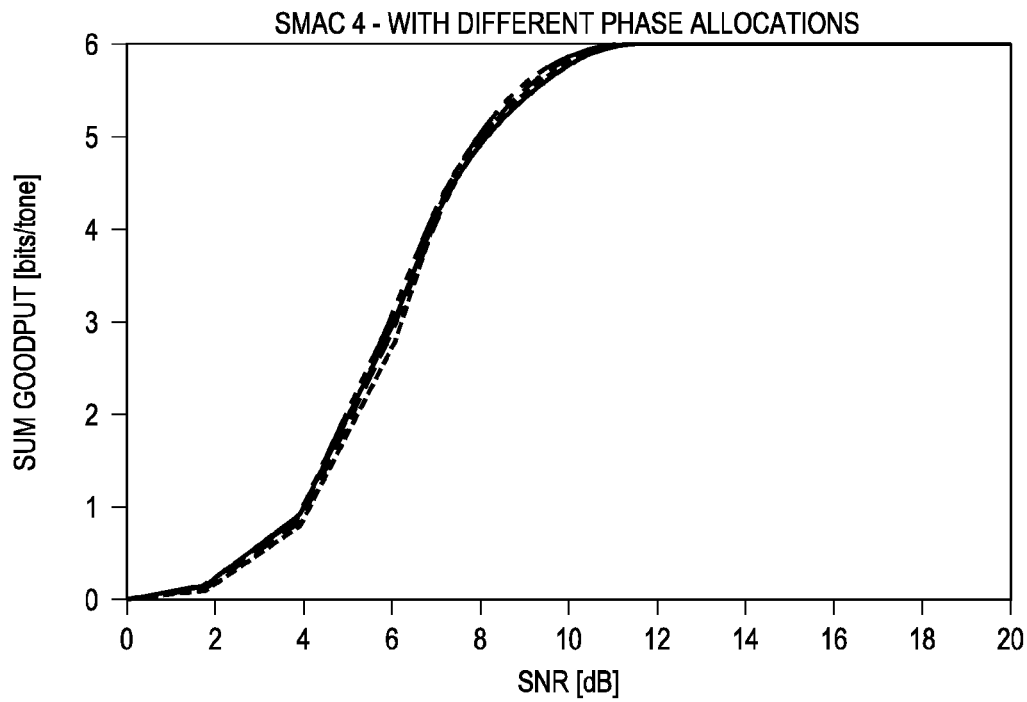
FIG. 23 illustrates a chart depicting impact of operator allocation on the performance of an SCMA code.

Regarding the Impact of operator allocation for SCMA. Allocation of the optimized operators to the interfering layers of a resource node is an issue which cannot be clearly addressed. For the underlying SCMA code, there are 16 different allocation options. FIG. 23 compares the performance of the 16 options in terms of overall goodput. Fortunately, the operator allocation shows a negligible impact on the ultimate performance of SCMA code. As mentioned before, the optimized phase/conjugate operators can be randomly or in a manual order allocated to the interfering layers.

Figure 24A:
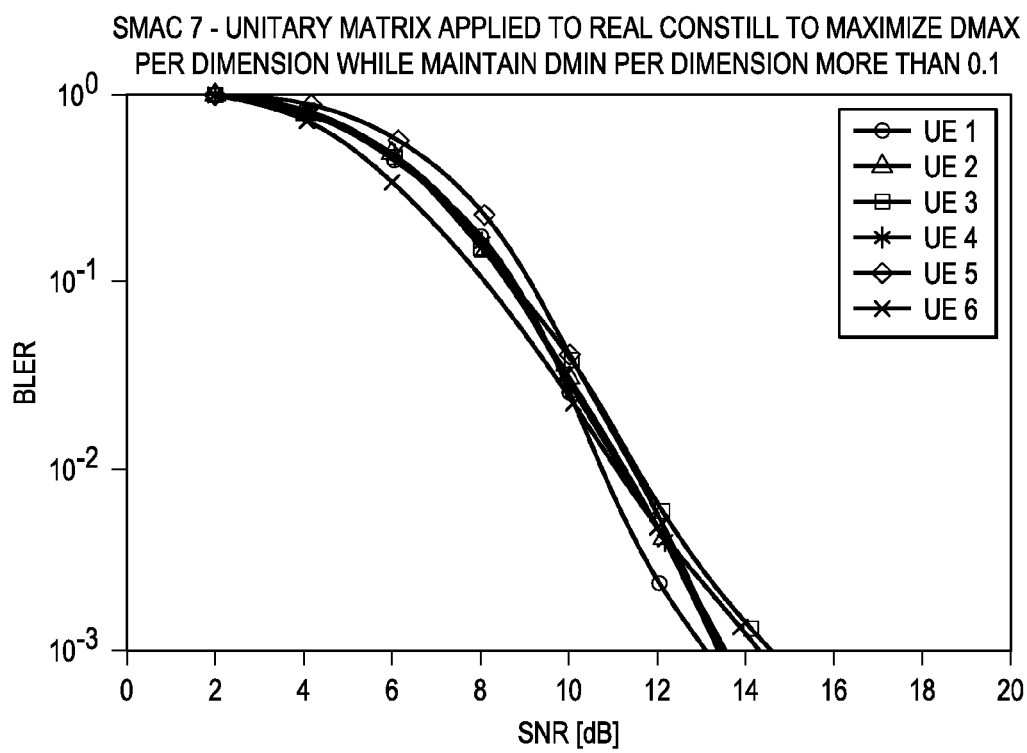
FIG. 24(a) illustrates a chart depicting impact of the real domain unitary operator on the performance of an SCMA code.
Figure 24B:
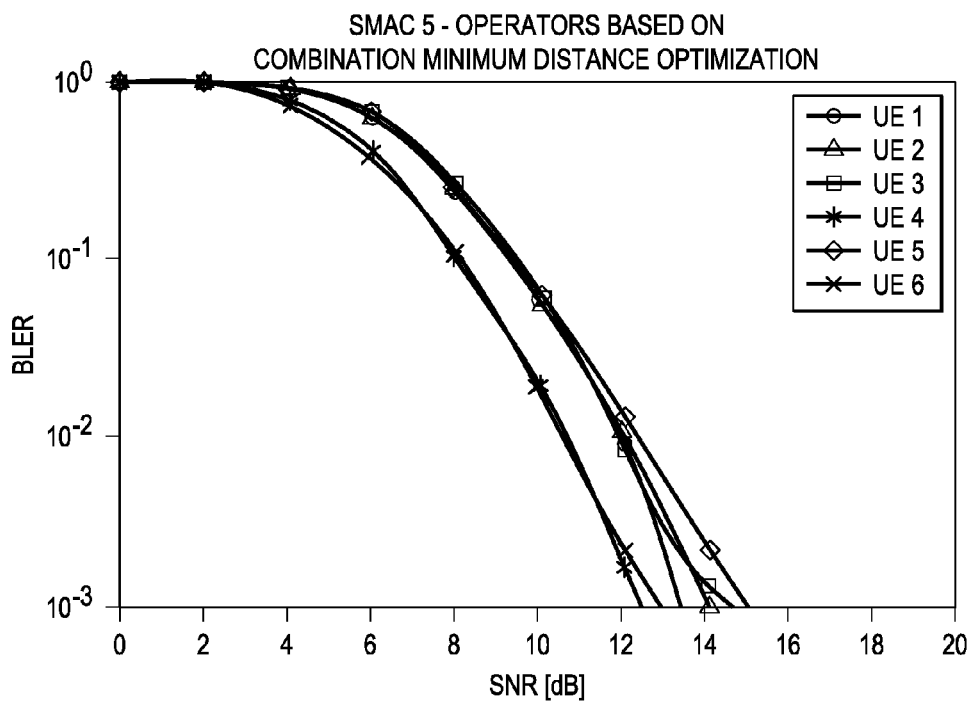
FIG. 24(b) illustrates a chart depicting impact of the real domain unitary operator on the performance of another SCMA code.

Regarding the Effect of real domain unitary operation for SCMA. A unitary matrix can be applied on the real domain multi-dimensional constellation to change the dimensional properties of the points while maintaining the multi-dimensional (such as minimum distance of the constellation points) properties of the constellation unchanged. Dimensional power variation is an example of dimensional property of the multidimensional constellation. Also, minimum distance of the points over each dimension set is another dimensional property. In the example shown in FIG. 24 a real unitary matrix is applied to the real domain multi-dimensional constellation to maximize the maximum distance of the points in each dimension set while maintaining the minimum distance of each dimension set more than 0.1. The unitary matrix is optimized by a random search. Clearly, the real domain unitary matrix operator can improve the overall performance of an SCMA code.

Figure 25:
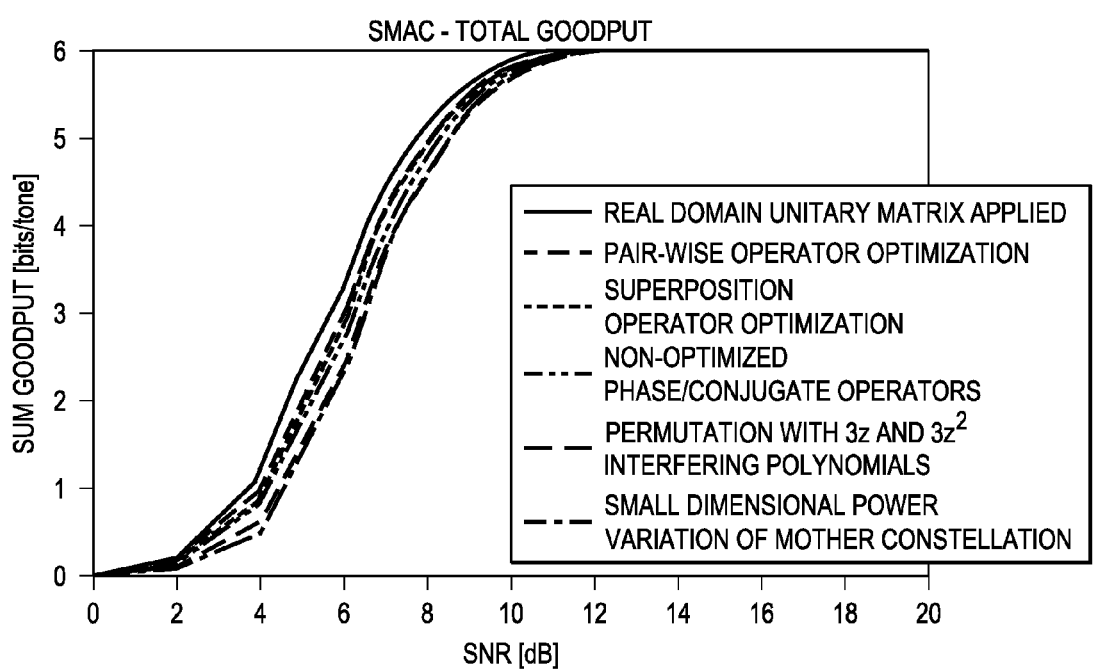
FIG. 25 illustrates a chart depicting total goodput of SCMA codes and impact of design parameters.

Regarding the Comparison of SCMA codes in terms of overall goodput. The overall sum goodput of the SCMA codes and the impact of the different optimization parameters are shown in FIG. 25. Comparison of the goodput curves confirms the efficiency of the multi-stage optimization approach proposed in this report.

Figure 26:
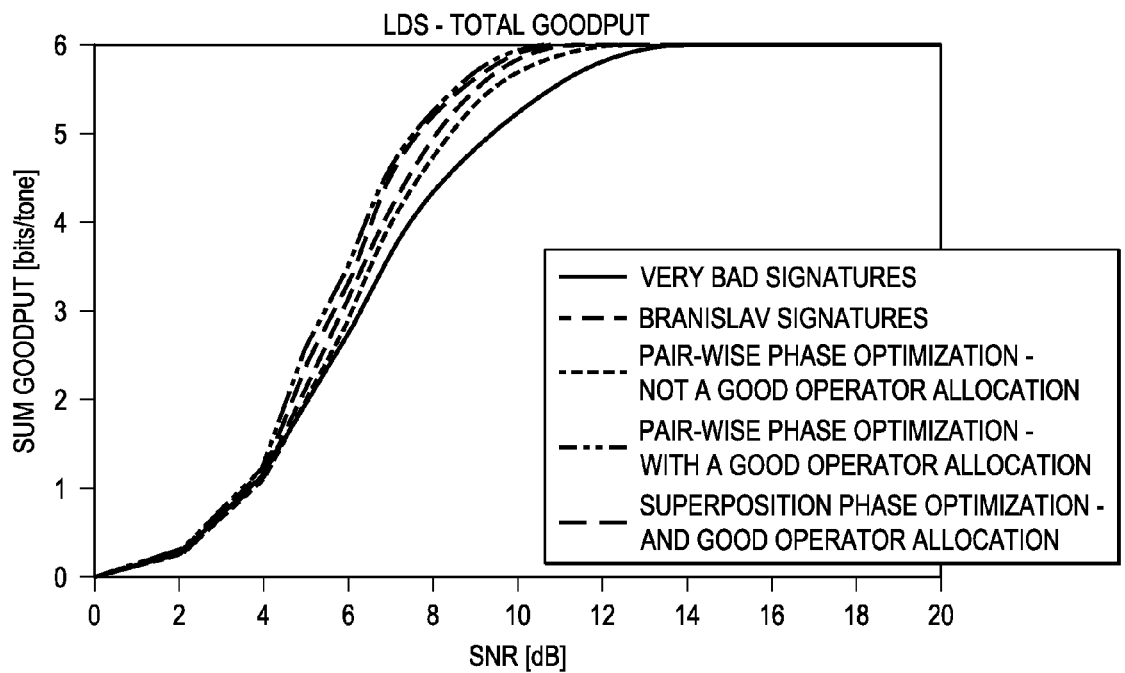
FIG. 26 illustrates a chart depicting LDS performance with different signature matrices.

Regarding the Signature optimization for LDS. One example of conventional LDS signatures can be found in "Multiple Access with Low-Density Signatures," Huawei Technologies Sweden, IEEE GLOBECOM 2009, which is incorporated herein by reference as if reproduced in its entirety. The goodput performance of the optimized LDS signatures (of this disclosure) and the conventional LDS signatures (found in the above mentioned IEEE article) are compared in FIG. 26. As opposed to SCMA, the impact of phase allocation is clearly huge by comparing allocation effect for the pair-wise optimized phases. With a good operator allocation, both superposing and pair-wise optimization criteria almost perform identically.

TABLE 3

Post-processing noise and signal power of different LDS signatures

| | | Layer-1 | Layer-2 | Layer-3 | Layer-4 | Layer-5 | Layer-6 |
|---|---|---|---|---|---|---|---|
| Very Bad | Noise | 0.191 | 0.035 | 0.141 | 0.141 | 0.035 | 0.191 |
| signature | Signal | 0.609 | 1.922 | 0.844 | 0.844 | 1.922 | 0.609 |
| Branislav | Noise | 0.171 | 0.171 | 0.019 | 0.171 | 0.096 | 0.096 |
| | Signal | 0.642 | 0.642 | 2.490 | 0.849 | 1.413 | 1.413 |
| Pair-wise bad | Noise | 0.141 | 0.141 | 0.250 | 0.000 | 0.141 | 0.141 |
| allocation | Signal | 0.844 | 0.844 | 0.375 | 3.000 | 0.844 | 0.844 |
| Pair-wise good | Noise | 0.136 | 0.117 | 0.136 | 0.036 | 0.156 | 0.036 |
| allocation | Signal | 0.663 | 0.895 | 0.742 | 1.440 | 0.742 | 1.440 |
| Superposition | Noise | 0.065 | 0.146 | 0.146 | 0.065 | 0.115 | 0.149 |
| good allocation | Signal | 1.301 | 0.770 | 0.770 | 1.301 | 0.888 | 0.686 |

The reason behind the behavior of the signatures can be explained based on their corresponding noise/signal processing as listed it Table 3. This table can predict the relative performance of the users of a signature matrix. For example, for the first signature set with a bad performance, the noise/signal analysis predicts that UE 2 and 5 have the best performance with the highest post-processing signal power and the lowest noise power. Meanwhile, UE 1 and 6 should have poor performance due to their lowest post-processing SINR. This predication can be confirmed by the link-level simulation results shown in FIG. 27(*a*).

Figure 27A:
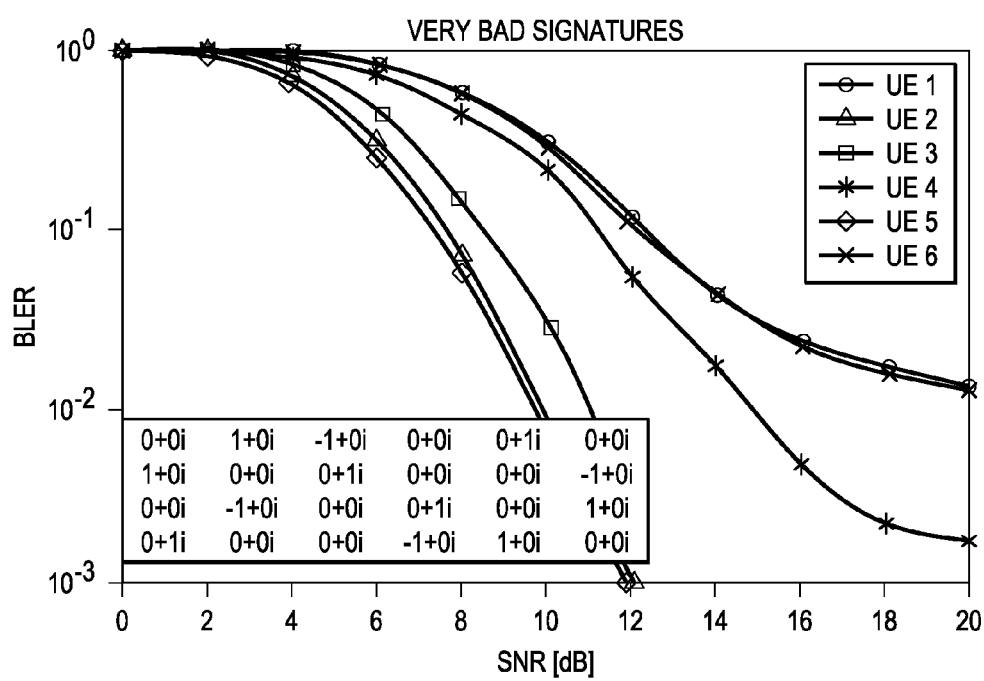
FIG. 27(a) illustrates a chart depicting performance of a set of LDS signatures.
Figure 27B:
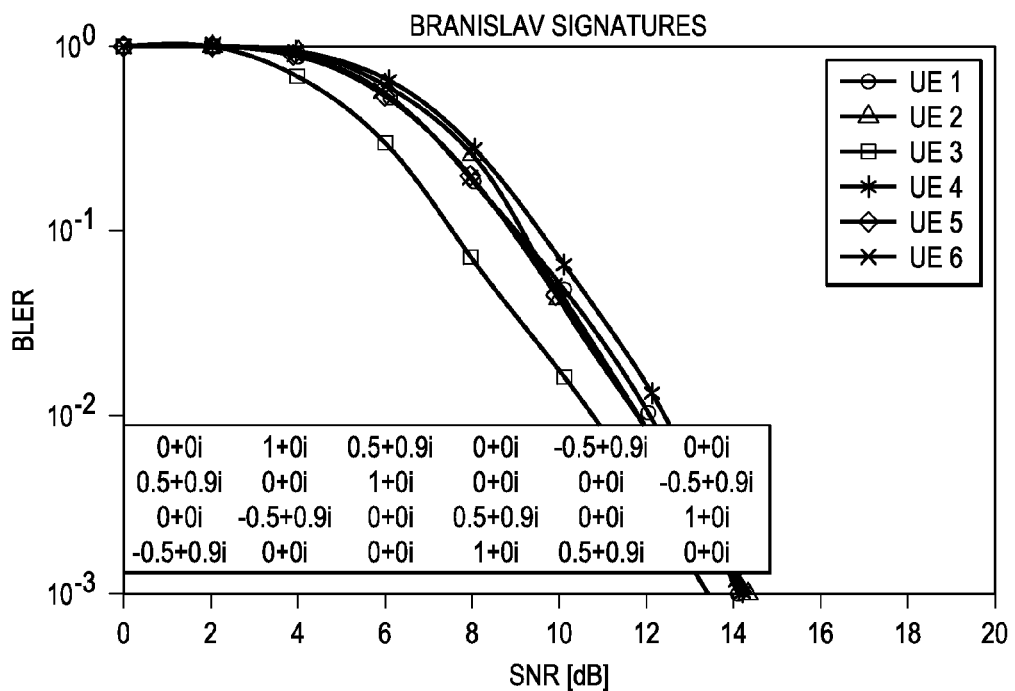
FIG. 27(b) illustrates a chart depicting performance of another set of LDS signatures.

According to the table, Branislav signatures have more uniform signal/noise distribution across the layers but still UE 3 outperforms the other UEs as also can be seen in FIG. 27(*b*). By comparing these two signature sets, one can conclude that a signature set provides better goodput performance if there is no big differences among the signal/noise power levels of the layers. As a general concept of SIC detection, a minor difference between the layers can help to improve the performance of a SIC detection but a large difference tends to a performance loss as shown for the first signature set.

Figure 28A:
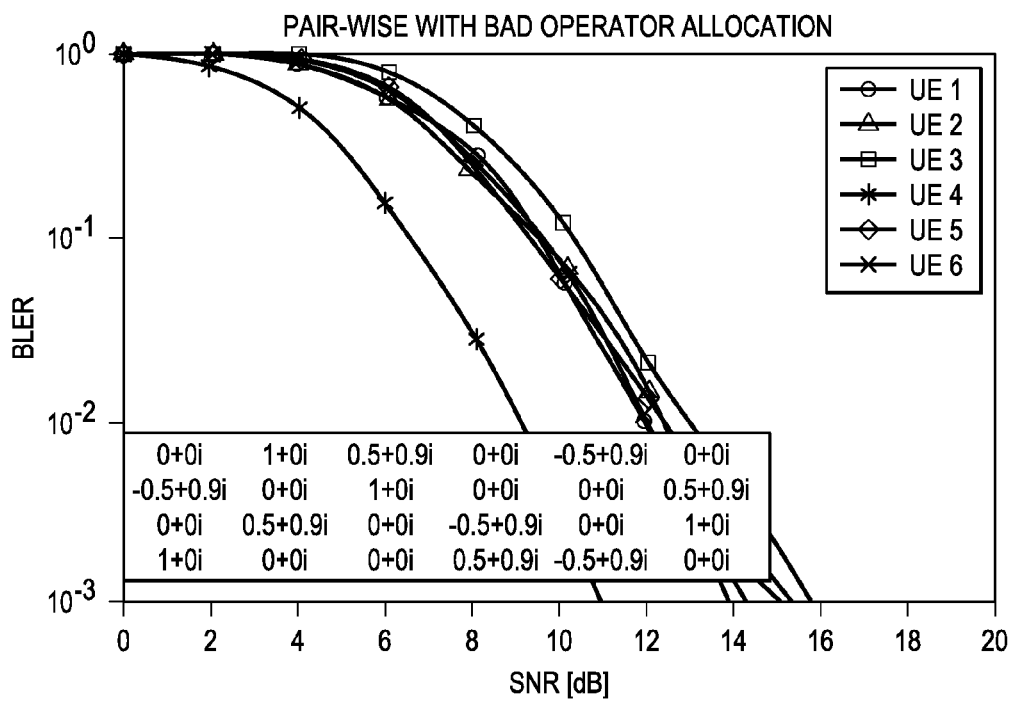
FIG. 28(a) illustrates a chart depicting performance of a set of LDS signatures with pair-wise optimization of phase operators.
Figure 28B:
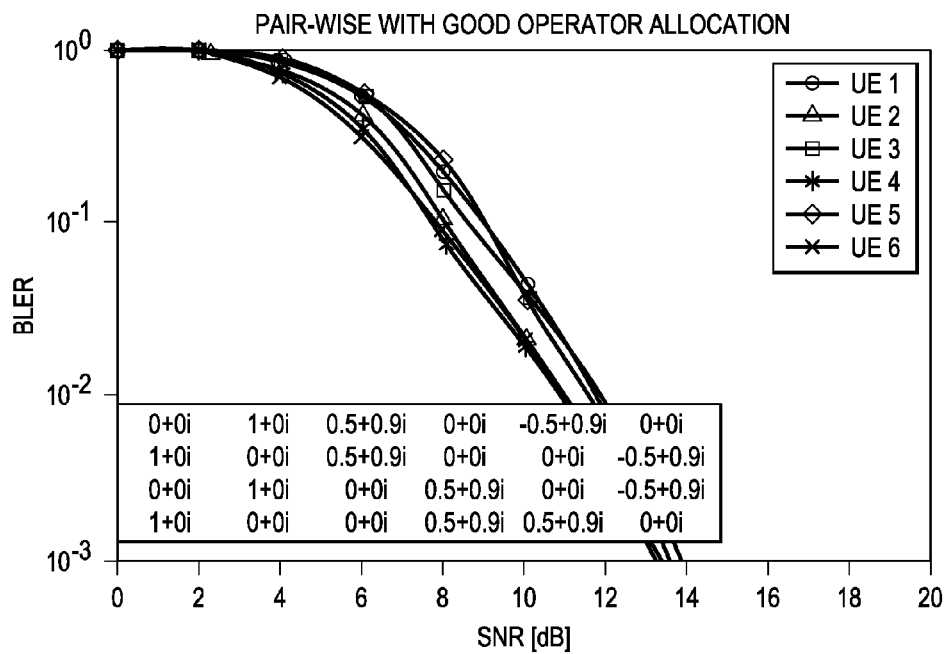
FIG. 28(b) illustrates a chart depicting performance of another set of LDS signatures with different pair-wise optimization of phase operators.

The impact of the phase allocation of the performance of LDS can be seen in Table 3 and FIGS. 28(*a*)-(*b*) for the pair-wise optimized phases. With a good phase operator allocation, the post-processing signal/noise power levels of the signature set are balanced and hence the overall performance is improved.

Figure 29:
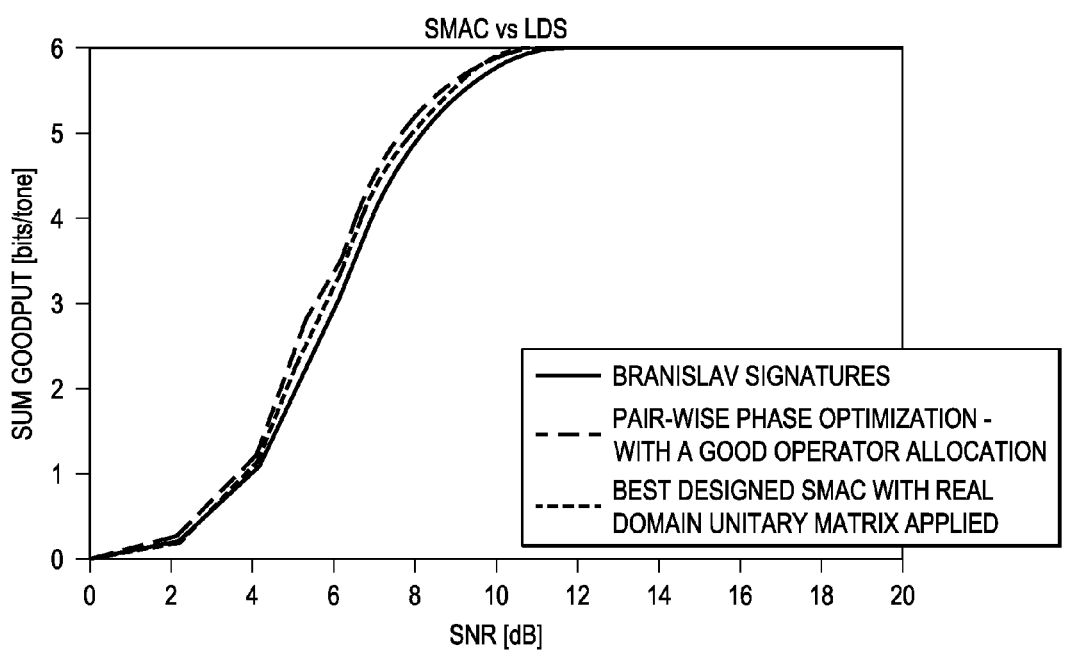
FIG. 29 illustrates a chart depicting performance of SCMA vs. LDS.

Regarding the Performance of SCMA vs. LDS. In theory SCMA should outperform LDS due to the shaping gain of the multi-dimensional constellation. However, the potential gain is feasible if the optimal or near-optimal SCMA code is feasible with a reasonable design approach. FIG. 29 compares the performance of Branislav LDS as the baseline with our best SCMA and best LDS. Our both LDS and SCMA solution outperform the baseline but the gain of SCMA over best LDS is not noticeable, for this particular example. SCMA as a new multiple-access modulation approach is propped which has the advantages of CDMA and LDS as well as some potential gain of complex domain coding gain. Even though the structure of the code is well defined, the design and optimization of the code is a channeling part. A sub-optimal design methodology is proposed here based on a multi-stage optimization approach. In addition, a fast and efficient evaluation methodology is developed based on EXIT chart technique to design SCMA codes.

It is shown that LDS is a special simplified case of the SCMA structure. Consequently, the developed design methodology of SCMA is reused to design LDS signatures is a systematic manner. The simulation results provided illustrate the efficiency of the design approach for both SCMA and LDS.

Regarding the EXIT Chart Modeling. Belief propagation algorithm rely on convergence of the belief among nodes as the information is passed back and forth between the nodes in a graph such as LDPC, turbo code, LDS, etc. extrinsic information transfer (EXIT) chart is introduced by Stephen ten Brink (2001) and developed by many others to design, predict the performance and compare different codes. In an exit chart, the average belief after each node as a function of the average belief entered to the same node for given intrinsic information is described and predicts whether the iteration results in better understanding of the encoded information.

Regarding the EXIT chart Modeling, to find the transfer function for any node, one needs to model the extrinsic information passed to the node with a reasonable statistical model and then examine the statistics of the output information at the output of the node. An SCMA decoder consists of layer nodes and resource nodes. The resource nodes also receive intrinsic information due to the received complex signal passed through the channel. The extrinsic information passed to each node for both layer and resource nodes consists of the N-tuples of probabilities (with N=4 for 2-bit nodes). The outputs are also of the same structure and the information carried by those probabilities (over many N-tuples) is simply the entropy defined by those probabilities. In the following the procedure for extracting the EXIT chart for each component is examined. For simplicity we focus on SCMA matrix consisting of four resource nodes and six layer nodes. We assume that each resource node comprises of three symbols and each layer node connects to two resource nodes. We also limit the EXIT chart extraction to AWGN SISO channel. Such restrictions do not limit the generality of the approach.

Regarding the Modeling Intrinsic Information at Resource Nodes, the input to the resource node as the extrinsic information is the received complex signal which comprises of the superposition of the three transmitted signal plus AWGN. To model that, for each input instance, three input tuples of size 2 bits are randomly generated. Then the received signal assuming a given SNR is calculated. The variance of the noise is $N_0$=P/SNR, where P is the total transmit power and SNR is the given fixed SNR.

Regarding the EXIT chart Modeling 4-tuples Extrinsic Probabilities for Resource Nodes, the extrinsic information for the resource nodes consists of four probabilities constrained to a summation on one and correlated with the actual transmitted point. Here, for each point in the constellation, we model its probability with the probability out of a BPSK transmission over AWGN model. For this purpose, we assume we have an AWGN channel with transmit power P associated with the power the arriving extrinsic information and noise power $N_1$. One should notice that value of $N_1$ has nothing to do with the actual noise power at the channel and is only a tool to generate N-tuples of SNR with different levels of information. As for the transmitted power P, we will discuss it later. A larger noise power in the model results in a lower level of information at the input and vice versa.

For all the N points in the constellation, we generate a binary transmission over an AWGN channel. For the actual transmitted point (the one point that is transmitted when modeling the intrinsic information), we assume +1 is transmitted and for all other N−1 points, we assume −1 is transmitted. Therefore, the LLR resulting from the actual transmitted point is $$= \frac{4y\sqrt{P}}{N_1},$$

where y is $\sqrt{P}+n$ for the actual transmitted point and $-\sqrt{P}+n$ for all other points. This gives us a vector of LLRs with size N. Each LLR can then be transformed in to probability as $$= \frac{1}{1 + e^{-LLR}}.$$

The resulting probabilities are then normalized to meet the sum constraint. The entropy represented by these probabilities is described by $\Sigma -p \log_2 p$. Finally, by repeating this procedure over many realizations of probabilities, the average extrinsic information at the input of the resource nodes is determined. The average extrinsic information is then $\log_2 M + E\{\Sigma p \log_2 p\}$. Please note that for a resource node connected to three layer node, the extrinsic information level are not necessarily the same and one can assign different noise levels ($N_1$) to the model described here. However, since the extrinsic information for one link is not a function of the information arriving from the same link, focusing on one link as the output, we need to generate the extrinsic input for the other two only. In other words, the EXIT chart for one specific output for a given SNR at the channel is a function with two inputs and one output. However, for simplicity of EXIT chart visualization, we use the same noise level at the input and use the average information of the inputs as the average input information.

Regarding the EXIT chart Modeling 4-tuples Extrinsic Probabilities for Layer Nodes. Layer nodes in SCMA have no intrinsic information unless non-uniform constellation probability distribution is used. Other than that the generation of the input information is the same as what just described for resource nodes. However, the very structure of the layer nodes makes prediction of the behavior easier. In a layer node with M links, each link at the output combines the information at the input of all other links. For a Gaussian input, it just reduces to MRC which means the output SNR at each link is the sum of the input SNR at each link. In other words, one can assume that the power at the output of each node is the summation of the input power for all other nodes. This phenomenon is used for assigning the power at the input of the model for resource nodes.

With this model, we do not need to explicitly describe the EXIT chart of a layer node, and for a 2-link layer node, the output extrinsic info for each node, is the input extrinsic info for the other node and vice versa.

Regarding the Model for Power Assignment for Resource Node Input. As described earlier, the complete EXIT chart for each node is a multi-dimensional function. In order to represent it by a one-dimensional function one should assume a relationship between different inputs to the node. Here, we use power assignment for different links to differentiate between them. For example, if different users have different signal powers, this can be reflected in the power assignment for the inputs to a resource node. It was mentioned earlier that the input to the resource node is the output of the layer nodes and the EXIT function to that is the sum of the power for all other components in the signature to that user. Therefore, one can assign the transmit power for different inputs based on the power allocated for all other constellation points for that stream (not including the one in question) and differentiate between the users in the same resource node.

Regarding the Model for Power Assignment for Layer Node Input. The extrinsic information coming out of a resource node is a function of many things, but the most important factor is its power per that layer in that resource. Therefore, the power allocation for the input of a layer node is simply proportional to the power of that layer in the corresponding resource.

Regarding the Probability Combining at Layer Nodes. The outcome of the MPA for SCMA is the N-tuple probabilities at the layer nodes. This is done by multiplying all the extrinsic information probabilities at the layer node and normalizing it to a sum of one. To model this, we model the system with parallel binary symmetric channels. For each link to the layer node, the extrinsic information is modeled by the information received from $M = \log_2(N)$ parallel BSC with capacity equal to $$C_l = \frac{I_l}{M}$$

where $I_l$ is the total information at the output of the lth corresponding resource nodes attached to the layer node. When the layer node is connected to multiple links, we model it by having parallel independent BSC channels. The capacity of this channel is given by the following, assuming that there are L parallel links each with error probability of $0 \leq p_l \leq \frac{1}{2}$, $l=1, \ldots, L$, where $C_l = 1 + p_l \log_2(p_l) + q_l \log_2(q_l)$, and $q_l = 1 - p_l$ $$C = -M\left(\sum_{m=0}^{2^L-1} X_m \log_2(X_m) + \sum_{l=1}^{L}(1 - C_l)\right)$$

where $$X_m = \frac{\prod_{l=1}^{L} q_l^{1-a_{lm}} p_l^{a_{lm}} + \prod_{l=1}^{L} q_l^{a_{lm}} p_l^{1-a_{lm}}}{2}$$

and $a_{lm}$ is the bit in the lth position of L-bit binary representation of $m = 0, \ldots, 2^L - 1$.

Figure 30:
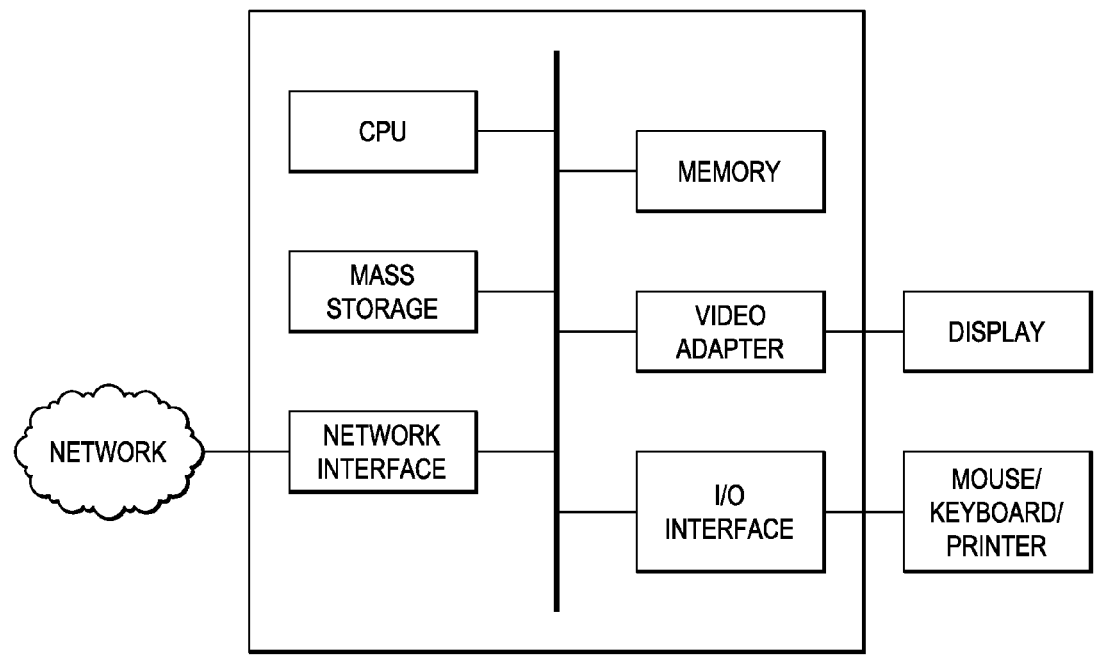
FIG. 30 is a block diagram illustrating a computing platform.

FIG. 30 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 31:
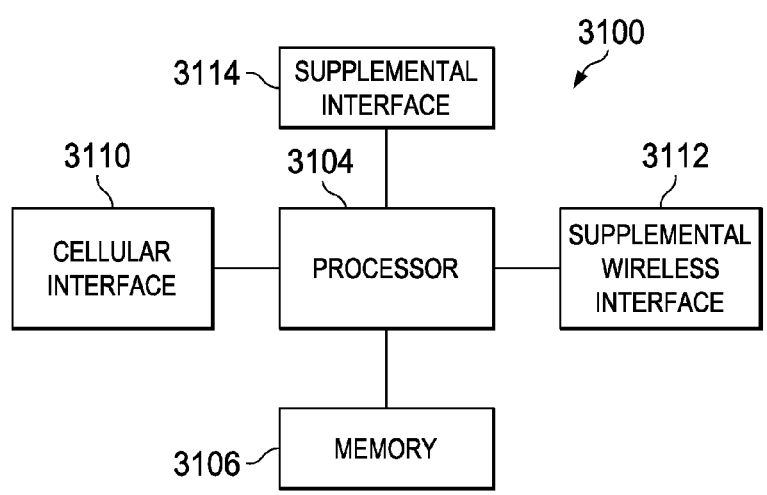
FIG. 31 illustrates a block diagram of an embodiment communications device.

FIG. 31 illustrates a block diagram of an embodiment of a communications device 3100, which may be equivalent to one or more devices (e.g., UEs, NBs, etc.) discussed above. The communications device 3100 may include a processor 3104, a memory 3106, a cellular interface 3110, a supplemental wireless interface 3112, and a supplemental interface 3114, which may (or may not) be arranged as shown in FIG. 31. The processor 3104 may be any component capable of performing computations and/or other processing related tasks, and the memory 3106 may be any component capable of storing programming and/or instructions for the processor 3104. The cellular interface 3110 may be any component or collection of components that allows the communications device 3100 to communicate using a cellular signal, and may be used to receive and/or transmit information over a cellular connection of a cellular network. The supplemental wireless interface 3112 may be any component or collection of components that allows the communications device 3100 to communicate via a non-cellular wireless protocol, such as a Wi-Fi or Bluetooth protocol, or a control protocol. The device 3100 may use the cellular interface 3110 and/or the supplemental wireless interface 3112 to communicate with any wirelessly enabled component, e.g., a base station, relay, mobile device, etc. The supplemental interface 3114 may be any component or collection of components that allows the communications device 3100 to communicate via a supplemental protocol, including wire-line protocols. In embodiments, the supplemental interface 3114 may allow the device 3100 to communicate with another component, such as a backhaul network component.

While embodiments of this disclosure has been described with reference to illustrative embodiments, this description is not intended to be construed in a limiting sense. Various modifications and combinations of the illustrative embodiments, as well as other embodiments of this disclosure, will be apparent to persons skilled in the art upon reference to the description. It is therefore intended that the appended claims encompass any such modifications or embodiments.

What is claimed is:

1. A method for multiplexing data, the method comprising:
receiving a first binary or M-ary data associated with a first multiplexed layer;
encoding the first binary or M-ary data by mapping the first binary or M-ary data directly to a first codeword associated with a binary or M-ary value of the first binary or M-ary data without mapping the first binary or M-ary data to an intermediate modulation symbol, wherein the first codeword is from a first codebook assigned exclusively to the first multiplexed layer;
multiplexing the first codeword with at least a second codeword from a second codebook to obtain multiplexed codewords, wherein the second codebook is assigned exclusively to a second multiplexed layer; and
transmitting the multiplexed codewords over shared resources of a network.

2. The method of claim 1, wherein encoding the first binary or M-ary data by selecting the first codeword comprises:
selecting the first codeword from a first set of codewords in the first codebook in accordance with the binary or M-ary value of the first binary or M-ary data, wherein each codeword in the first set of codewords is associated with a different binary or M-ary value.

3. The method of claim 2, wherein each codeword in the first set of codewords comprises a low density of non-zero values such that the corresponding codeword can be detected within multiplexed codewords in accordance with a message passing algorithm (MPA).

4. The method of claim 1, wherein the first multiplexed layer is associated with a first user and the second multiplexed layer is associated with a second user.

5. The method of claim 1, wherein the first multiplexed layer and the second multiplexed layer carry separate data streams associated with a common.

6. The method of claim 5, wherein the first multiplexed layer and the second multiplexed layer occupy different multiple-input-multiple-output (MIMO) spatial layers.

7. The method of claim 5, wherein the first multiplexed layer and the second multiplexed layer occupy different Orthogonal Frequency-Division Multiple Access (OFDMA) tones.

8. A transmitter comprising:
a processor; and
a computer readable storage medium storing programming for execution by the processor, the programming including instructions to:
receive a first binary or M-ary data associated with a first multiplexed layer;
encode the first binary or M-ary data by mapping the first binary or M-ary data directly to a first codeword associated with a binary or M-ary value of the first binary or M-ary data without mapping the first binary or M-ary data to an intermediate modulation symbol, wherein the first codeword is from a first codebook assigned exclusively to the first multiplexed layer;
multiplex the first codeword with at least a second codeword from a second codebook to obtain multiplexed codewords, wherein the second codebook is assigned exclusively to a second multiplexed layer; and
transmit the multiplexed codewords over shared resources of a network.

9. A method for receiving data, the method comprising:
receiving a signal carrying multiplexed codewords, the multiplexed codewords including a plurality of codewords communicated over shared resources of a network, wherein each of the plurality of codewords belongs to a different one of a plurality of codebooks, wherein each of the plurality of codebooks are associated with a different one of a plurality of multiplexed layers;
identifying, by a receiver, a first one of the plurality of codewords within the multiplexed codewords, the first codeword belonging to a first one of the plurality of codebooks assigned exclusively to a first one of the plurality of multiplexed layers, wherein the receiver is associated with the first multiplexed layer; and
decoding the first codeword by directly mapping the first codeword to a first binary or M-ary value without identifying an intermediate modulation symbol.

10. The method of claim 9, wherein identifying the first codeword within the multiplexed codewords comprises applying a message passing algorithm (MPA) to detect the first codeword amongst the plurality of codewords included within the multiplexed codewords.

11. The method of claim 10, wherein each codeword in the first codebook is associated with a different binary or M-ary value.

12. The method of claim 10, wherein different ones of the plurality of multiplexed layers occupy different multiple-input-multiple-output (MIMO) spatial layers.

13. The method of claim 9, wherein different ones of the plurality of multiplexed layers occupy different Orthogonal Frequency-Division Multiple Access (OFDMA) tones.

14. A receiver comprising:
a processor; and
a computer readable storage medium storing programming for execution by the processor, the programming including instructions to:
receive a signal carrying multiplexed codewords, the multiplexed codewords including a plurality of codewords communicated over shared resources of a network, wherein each of the plurality of codewords belongs to a different one of a plurality of codebooks, wherein each of the plurality of codebooks are associated with a different one of a plurality of multiplexed layers;
identify a first one of the plurality of codewords within the multiplexed codewords, the first codeword belonging to a first one of the plurality of codebooks assigned exclusively to a first one of the plurality of multiplexed layers, wherein the receiver is associated with the first multiplexed layer; and
decode the first codeword by directly mapping the first codeword to a first binary or M-ary data without identifying an intermediate modulation symbol.

15. A method for designing Sparse Code Multiple Access (SCMA) code, the method comprising:
generating a plurality of multi-dimensional modulation codebooks; and
generating a plurality of sparse codebooks from the plurality of multi-dimensional modulation codebooks, wherein each of the plurality of sparse codebooks comprises a plurality of sparse codewords, and
wherein different sparse codewords within a sparse codebook are pre-associated with different binary or M-ary values prior to data encoding.

16. The method of claim 15, wherein each codeword in the plurality of sparse codebooks comprise a low density of non-zero values such that the corresponding codeword can be detected within multiplexed codewords in accordance with a message passing algorithm (MPA).

17. The method of claim 15, wherein each of plurality of multi-dimensional modulation codebooks are assigned to a different multiplexed layer.

18. A method for designing Sparse Code Multiple Access (SCMA) code, the method comprising:
generating a plurality of mapping matrices;
generating at least one multi-dimensional constellation;
modifying a permutation operator in accordance with an optimization algorithm to the at least one multi-dimensional constellation; and
generating SCMA codewords in accordance with the mapping matrices, the at least one multi-dimensional constellation, and the modified permutation operator, wherein modifying the permutation operator in accordance with the optimization algorithm increases power diversity over interfering layers associated with the SCMA codewords.

19. A method for designing low density signature (LDS) code, the method comprising:
generating a plurality of mapping matrices;
modifying one or more phase operators in accordance with an optimization algorithm; and
generating LDS signatures in accordance with the mapping matrices, and the one or more modified phase operators, wherein modifying the one or more phase operators increases a Euclidian distance between interfering layers associated with the LDS signatures.

20. The method of claim 19, wherein each of the LDS signatures are assigned to a different multiplexed layer.

21. A method for designing Sparse Code Multiple Access (SCMA) code, the method comprising:
generating a plurality of mapping matrices;
generating a multi-dimensional constellation;
modifying a phase or conjugate operator in accordance with an optimization algorithm; and
generating SCMA codewords in accordance with the mapping matrices, the multi-dimensional constellation, and the modified phase or conjugate operator, wherein modifying the phase or conjugate operators increases a Euclidian distance between interfering layers associated with the SCMA codewords.

* * * * *